(12) United States Patent
Jiang et al.

(10) Patent No.: US 10,437,466 B2
(45) Date of Patent: Oct. 8, 2019

(54) FORMULA INPUTTING METHOD AND APPARATUS

(71) Applicant: Samsung Electronics Co., Ltd., Suwon-si, Gyeonggi-do (KR)

(72) Inventors: Yingying Jiang, Beijing (CN); Shuli Yang, Beijing (CN); Youxin Chen, Beijing (CN); Bo Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 15/551,828

(22) PCT Filed: Feb. 16, 2016

(86) PCT No.: PCT/KR2016/001543
§ 371 (c)(1),
(2) Date: Aug. 17, 2017

(87) PCT Pub. No.: WO2016/133335
PCT Pub. Date: Aug. 25, 2016

(65) Prior Publication Data
US 2018/0067640 A1    Mar. 8, 2018

(30) Foreign Application Priority Data

Feb. 17, 2015  (CN) .......................... 2015 1 0086434
Dec. 18, 2015  (CN) .......................... 2015 1 0959336
Feb. 16, 2016  (KR) ........................ 10-2016-0017777

(51) Int. Cl.
*G06F 3/0488*  (2013.01)
*G06F 17/24*  (2006.01)
*G06K 9/72*  (2006.01)
*G06F 17/10*  (2006.01)
*G06F 17/12*  (2006.01)
*G06F 17/16*  (2006.01)

(52) U.S. Cl.
CPC ...... *G06F 3/04883* (2013.01); *G06F 3/04886* (2013.01); *G06F 17/10* (2013.01); *G06F 17/242* (2013.01); *G06K 9/72* (2013.01); *G06F 17/12* (2013.01); *G06F 17/16* (2013.01)

(58) Field of Classification Search
CPC .................................................. G06F 3/04883
USPC ....................................................... 715/863
See application file for complete search history.

(56) References Cited

U.S. PATENT DOCUMENTS

| | | |
|---|---|---|
| 5,627,914 A | 5/1997 | Pagallo |
| 5,680,638 A | 10/1997 | Satoh et al. |
| 7,561,737 B2 | 7/2009 | Zou et al. |
| 8,504,600 B2 | 8/2013 | Hatch |
| 8,619,045 B2 | 12/2013 | Yoshizawa |
| 9,047,267 B2 | 6/2015 | Zie et al. |

(Continued)

FOREIGN PATENT DOCUMENTS

| | | |
|---|---|---|
| KR | 10-2012-0009505 A | 1/2012 |
| KR | 10-2012-0075587 A | 7/2012 |

*Primary Examiner* — William D Titcomb
(74) *Attorney, Agent, or Firm* — Jefferson IP Law, LLP

(57) ABSTRACT

A formula inputting method is provided. The formula inputting method includes receiving a handwriting input of a user; obtaining handwriting content based on the handwriting input of the user; determining at least one or more recommended content based on the handwriting content; and displaying the handwriting content and the one or more recommended content.

20 Claims, 21 Drawing Sheets

(56) References Cited

U.S. PATENT DOCUMENTS

| | | | |
|---|---|---|---|
| 2006/0005115 A1 | 1/2006 | Ritter et al. | |
| 2009/0304283 A1* | 12/2009 | Predovic | G06K 9/00436 |
| | | | 382/189 |
| 2011/0080409 A1 | 4/2011 | Lee | |
| 2011/0080608 A1* | 4/2011 | Do | G06F 3/04883 |
| | | | 358/1.15 |
| 2012/0162107 A1* | 6/2012 | Yoshizawa | G06F 3/04883 |
| | | | 345/173 |
| 2012/0327102 A1 | 12/2012 | Midorogi et al. | |
| 2013/0031495 A1 | 1/2013 | Wang et al. | |
| 2013/0067306 A1 | 3/2013 | Bhargav et al. | |
| 2013/0290390 A1 | 10/2013 | Choe et al. | |
| 2013/0290391 A1 | 10/2013 | Kamitani | |
| 2016/0154555 A1* | 6/2016 | Perrin | G06F 3/04883 |
| | | | 715/765 |

\* cited by examiner

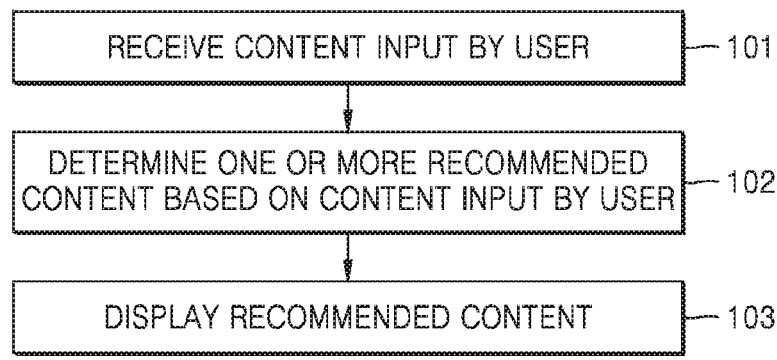
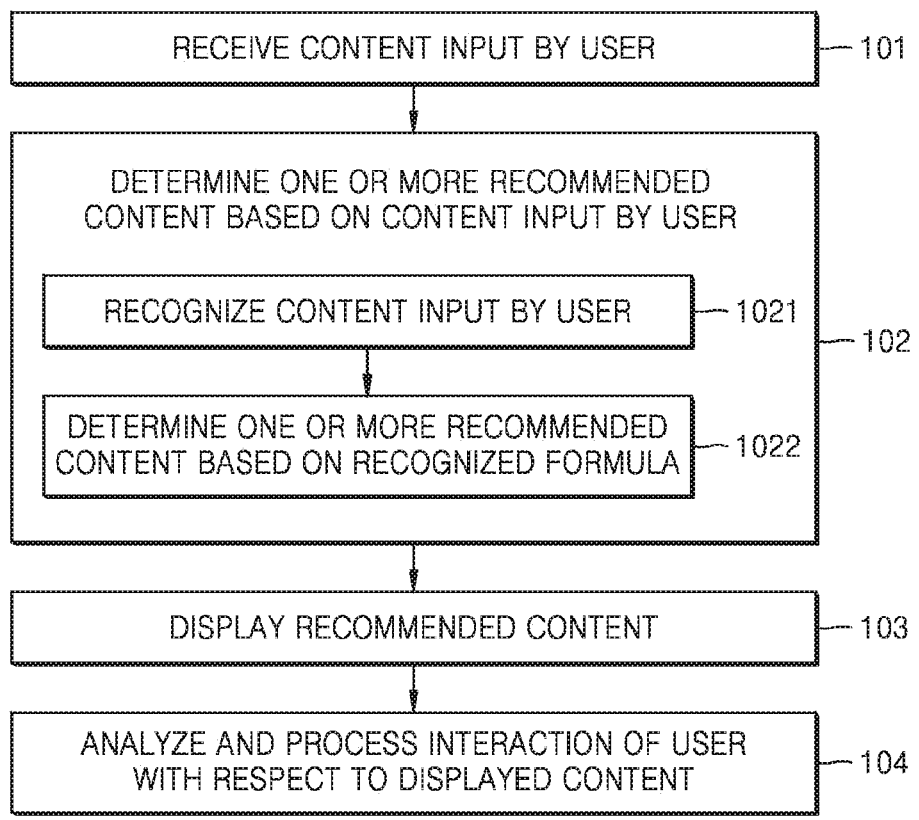

FIG. 4

| HANDWRITING INPUT | / | — | √ | ∫ | ∮ | Σ | π | → | lim | min |
|---|---|---|---|---|---|---|---|---|---|---|
| STRUCTURE OF RECOMMENDING FORMULA | □/□ | | √□ | ∛□ | ∫□ | ∮□ | Σ□ | □ | ↑□ | lim□ □ | min□ □ |

| HANDWRITING INPUT | max | log | ∪ | ∩ | ∨ | ∧ | (a, a) | [a, a] | (a₁ a₂) | [a₁ a₂] |
|---|---|---|---|---|---|---|---|---|---|---|
| STRUCTURE OF RECOMMENDING FORMULA | max□ | log□ | ∪□ | ∩□ | ∨□ | ∧□ | (□, □) | [□, □] | (a₁ a₂ / b₁ b₂) | [a₁ a₂ / b₁ b₂] |

FIG. 5

| | INPUT FORMULA | PREDICTION FORMULA |
|---|---|---|
| FORMULA SEARCH | sinx | $sinx = x - \frac{x^3}{3!} + \frac{x^5}{5!} - \frac{x^7}{7!} + \cdots$ |
| EXPRESSION FORM | sin | sinA |
| | f | f(x) |
| FORMULA THAT IS EQUIVALENT TO INPUT FORMULA AND HAS DIFFERENT EXPRESSION FORM | $H_2O$ | $\overset{H}{\diagdown}O\overset{H}{\diagup}$ |
| | $(a_{ij})_{m \times n}$ | $\begin{pmatrix} a_{11} & a_{12} & \cdots & a_{1n} \\ a_{21} & a_{22} & \cdots & a_{2n} \\ \cdots & \cdots & \cdots & \cdots \\ a_{m1} & a_{m2} & \cdots & a_{mn} \end{pmatrix}$ |
| INTRINSIC PROPERTY OF INPUT FORMULA | $\begin{bmatrix} a_{11} & a_{12} & a_{13} \\ a_{21} & & \end{bmatrix}$ | $\begin{bmatrix} a_{11} & a_{12} & a_{13} \\ a_{21} & a_{22} & a_{23} \end{bmatrix}$ |
| | $Na_2CO_3 + HCl = NaCl + H_2O + CO_2 \uparrow$ | $Na_2CO_3 + 2HCl = 2NaCl + H_2O + CO_2 \uparrow$ |

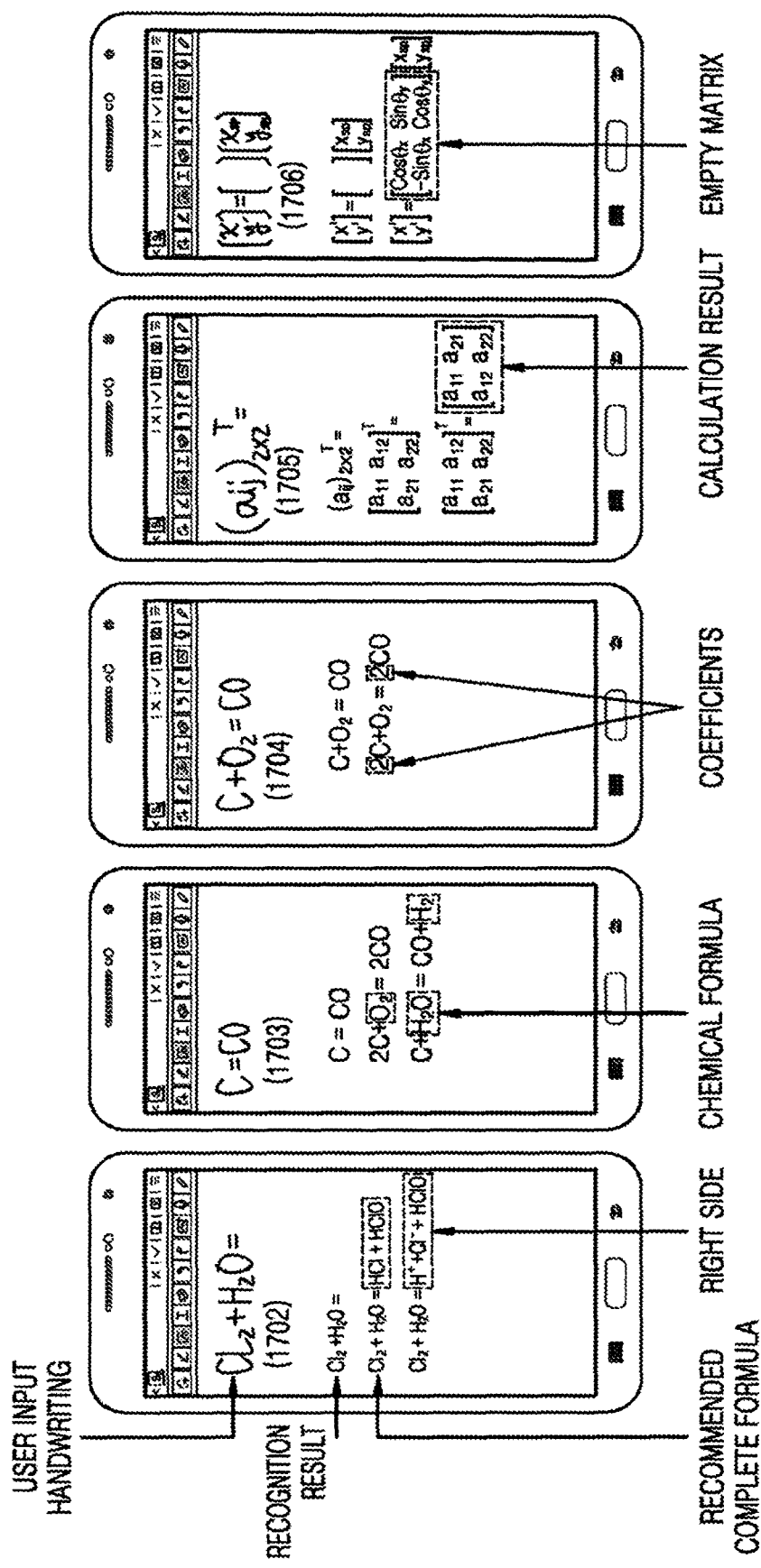

FORMULA INPUTTING METHOD AND APPARATUS

TECHNICAL FIELD

The present disclosure relates to handwriting inputting methods, and more particularly to, user input based formula inputting methods and apparatuses.

BACKGROUND ART

Inputting formulas that include mathematical equations, formulas, and the like may be required to perform document work, to perform calculations in a curriculum, or to analyze data in an industrial or laboratory environment. The formula may be assigned to a calculation engine and processed. Specifically, a front end of a computing engine (e.g., Mathematica) may implement numerical computations and graphical representations based on input formulas. The front end means preprocessing or control between a host computer and a user. Also, a formula may be input into a search engine. The search engine may search for information related to formulas using the input formula. Thus, inputting of a formula is a first step in applying the formula.

Accordingly, the present disclosure includes a method and an apparatus for inputting a formula more efficiently.

In general, formula input methods may be classified into two types. The two formula input methods may be a keyboard/mouse based formula input method and a handwriting recognition based formula input method.

The keyboard/mouse based input method generally may include two types. The keyboard/mouse based input method may include a string-based formula input such as LaTeX, and a formula editor-based input such as a formula editor of a word processor. To use a string-based formula input method, a user should generally be familiar with how to map a relationship between a string and a two-dimensional formula. In order to use a formula editor-based input method, the user may use a specific character list provided by the word processor and/or character inputs through a keyboard to select a structure of special characters and formulas (for example, a summation sign, integration symbol, etc.).

In order to use the keyboard/mouse-based formula input method described above, the user must be familiar with a formula structure and directly input all the contents of a formula to be input. For example, to input a sum symbol (I) to calculate a sum of values, the user must first input the sum symbol and then input lower and upper limit values of the sum.

According to the handwriting-based input method that will be described later, the user may input the formula directly by handwriting. The formula input method and apparatus according to an embodiment of the present specification may recognize a formula written directly by the user and may convert the formula into a printed font.

DETAILED DESCRIPTION OF THE INVENTION

Technical Problem

A handwriting-based formula inputting method and apparatus are provided.

Conventional formula inputting methods have the following disadvantages. Firstly, a keyboard/mouse-based formula inputting method is inconvenient. Specifically, the keyboard/mouse-based formula inputting method may have a low recognition rate. Also, the keyboard/mouse-based formula inputting method requires additional learning of a formula that the user desires to input. Secondly, a handwriting-based formula inputting method does not require any additional learning of the formula of the user but the recognition is error-prone like the keyboard/mouse-based formula inputting method. Also, a process of correcting an error may be complex. For example, input efficiency of a matrix formula and a recognition rate may be low.

Technical Solution

In order to overcome the above-described disadvantages, the present disclosure provides a formula inputting method and apparatus, and a corresponding electronic device.

According to a first aspect of the present disclosure, a formula inputting method is provided. The method includes: recognizing a formula input by a user and displaying the recognized formula; displaying recommended contents based on the recognized formula; and analyzing and processing an interactive operation of the user with respect to the displayed contents.

According to another aspect of the present disclosure, a formula inputting method is provided. The method includes: receiving contents input by a user during a formula inputting procedure; determining recommended contents based on the contents input by the user; and displaying the recommended contents.

In some embodiments of the present disclosure, if the contents input by the user include a formula, the determining of the recommended contents based on the contents input by the user includes: recognizing the formula input by the user; displaying the recognized formula; and determining the recommended contents based on the recognized formula.

In some embodiments of the present disclosure, the displaying of the recommended contents includes: in response to an operation of a writing utensil being close to a character in the recognized formula, displaying a recommended writing position around the character.

In some embodiments of the present disclosure, the displaying of the recommended contents includes: in response to an operation of a writing utensil being close to a predefined character in the recognized formula, displaying a recommended writing structure associated with the predefined character.

In some embodiments of the present disclosure, the displaying the recommended contents includes: obtaining a recommended formula associated to the recognized formula; and displaying the recommended formula.

In some embodiments of the present disclosure, the obtaining of the recommended formula comprises at least one of: based on the recognized formula, searching a formula database and writing history data of the user for a formula including same contents with the recognized formula; based on a current character in the recognized formula, predicting one or more following characters utilizing a language model; based on an attribute of the recognized formula, obtaining a formula with contents different from the recommended contents; based on an expressing form of the recognized formula, obtaining a formula with the same contents but in a different form with the recognized formula; based on elements of the recognized formula, obtaining a formula having the same elements but in a different form with the recognized formula; if the recognized formula is invalid, obtaining a valid formula associated with the recognized formula based on an element of the recognized formula; and based on contents of the recognized formula, obtaining a complete formula including the recognized formula.

In some embodiments of the present disclosure, the obtaining of the formula with contents different from the recommended contents based on the attribute of the recognized formula comprises at least one of: recommending the formula based on a similarity of contents and/or structure between different units of a matrix; and recommending a balanced chemical equation based on a balancing attribute of the chemical equation.

In some embodiments of the present disclosure, wherein the obtaining of the formula with the same meaning as the recognized formula but in the different form based on the expressing form of the recognized formula comprises obtaining the formula based on a formula characteristic and a formula database including formulas in different forms.

In some embodiments of the present disclosure, the formula characteristic includes at least one of: position relationship characteristic, such as a left-right relationship, a top-bottom relationship, a top-right relationship, a bottom-right relationship, an enclosing relationship; the formula type characteristic may be a matrix, division, radical calculation, summation, integration and chemical equation.

In some embodiments of the present disclosure, the formula database including the formulas in different forms includes at least one of: a formula and different forms of the formula, such as a simplified matrix and an expanded matrix, a chemical formula and a chemical structure, a chemical formula and an ionic formula; description and different forms of a formula, such as a chemical reaction and a chemical formula.

In some embodiments of the present disclosure, the recommended formulas are sorted according to at least one of: formula similarity, formula input frequency and formula difference degree.

In some embodiments of the present disclosure, the formula input by the user includes any one or any combination of: a handwritten formula; a formula selected by the user from a formula having been input; a formula input by calling a format template; a formula in a figure; and a formula input through scanning.

In some embodiments of the present disclosure, the recognizing of the handwritten formula includes: recognizing a predefined symbol in the handwritten formula in an associated predefined structure.

In some embodiments of the present disclosure, the predefined symbol is a repeat symbol or a symmetric symbol, the predefined structure associated with the repeat symbol is a structure in which an area indicated by the repeat symbol is filled with a character indicated by the repeat symbol; the predefined structure associated with the symmetric symbol is a structure in which an area indicated by the symmetric symbol is filled with a symmetric structure of a current structure.

In some embodiments of the present disclosure, the method further includes: analyzing and processing an interactive operation of the user.

In some embodiments of the present disclosure, the analyzing and processing of the interactive operation of the user includes: in response to a predefined operation of the user to the recommended contents, inputting some or all of the recommended contents.

In some embodiments of the present disclosure, the analyzing and processing of the interactive operation of the user includes: in response to a predefined operation of the user, switching between a writing mode and an editing mode, wherein the user is allowed to write a formula in the writing mode, and the user is allowed to perform an editing operation on the recognized formula in the editing mode.

In some embodiments of the present disclosure, the predefined operation includes any one of: pressing a button of a stylus pen; double clicking a touch screen; the user's finger touching or not touching the touch screen during the operation of the stylus pen; and selecting a system button or menu.

In some embodiments of the present disclosure, the analyzing and processing of the interactive operation of the user further includes: in the editing mode, correcting an error in the recognized formula in response to a predefined operation of the user.

In some embodiments of the present disclosure, the correcting the error includes at least one of: in response to a writing operation of the user over a recognized character, recognizing the written character and replacing the recognized character by the written character; in response to an operation of the user indicating a position relationship between two groups of recognized symbols, correcting the position relationship between the two groups of symbols; and in response to a unit segmenting operation of the user to recognized characters, correcting unit segmentation of the recognized characters.

In some embodiments of the present disclosure, the correcting of the error includes correcting a dimension of a recognized matrix in response to any one of the following operations: dragging at least one bracket of the matrix, such that two brackets of the matrix enclose matrix elements of required dimensions; rewriting at least one bracket of the matrix, such that the two brackets of the matrix enclose matrix elements of required dimensions; adding or correcting the dimensions on the right-bottom corner of the matrix to the required number; and correcting the dimension in a matrix dimension configuration interface.

In some embodiments of the present disclosure, the displaying of the recommended contents comprises: displaying the recommended contents in a manner different from the recognized formula.

In some embodiments of the present disclosure, the displaying of the recognized formula includes displaying the recognized formula in a printed font and/or in handwriting.

In some embodiments of the present disclosure, if the contents input by the user include a formula description, the determining of the recommended contents based on the contents input by the user includes: determining the recommended contents based on the formula description input by the user, the determined recommended contents including a formula corresponding to the formula description; or determining the recommended contents based on the formula description and an incomplete formula associated with the formula description, the determined recommended contents including a formula corresponding to the formula description and the associated incomplete formula.

In some embodiments of the present disclosure, the displaying of the recommended formula list includes at least one of: displaying recommended candidate formulas in a printed font; and displaying the recommended candidate formulas in a handwritten form.

In some embodiments of the present disclosure, the selected formula is presented in at least one of the following manners: displaying the selected formula in the printed font; and displaying the selected formula in the handwritten form.

According to a second aspect of the present disclosure, a formula inputting apparatus is provided. The apparatus includes: a recognizer, configured to recognize a formula input by a user; a display, configured to display the recognized formula and recommended contents obtained based on the recognized formula; and a processor, configured to analyze and process an interactive operation of the user to the displayed contents. The system may further include units or an apparatus which are configured to execute steps of various embodiments of the method described with respect to the first aspect of the present disclosure.

According to a third aspect of the present disclosure, an electronic device is provided. The electronic device includes a touch screen and a processor, wherein the processor is configured to recognize a formula input by a user, obtain recommended contents based on the recognized formula, control the touch screen to display the recognized formula and the recommended contents, and analyze and process an interactive operation of the user to the displayed contents; and the touch screen is configured to receive the formula and an operation instruction input by the user and display corresponding contents under the control of the processor. The processor is further configured to execute steps of various embodiments of the method described with respect to the first aspect of the present disclosure.

According to a fourth aspect of the present disclosure, a formula inputting method is provided. The method includes: recognizing a formula input by a user and displaying the recognized formula; displaying recommended contents based on the recognized formula; and analyzing and processing an interactive operation of the user to the displayed contents; wherein the recommended contents includes a formula which has the same meaning but in a different expressing form with the recognized formula.

In some embodiments, the recognized formula is a matrix, and the expressing form includes any one of: an expanded form of the matrix and an abbreviated form of the matrix.

In some embodiments of the present disclosure, the recommended contents further include: a formula which is recommended based on similarity of contents and/or structure between different units of the matrix.

In some embodiments of the present disclosure, the recognizing of the formula input by the user includes: recognizing a predefined symbol in the handwritten formula in a predefined structure; wherein the predefined symbol includes a repeat symbol and a symmetric symbol, the predefined structure associated with the repeat symbol is a structure in which an area indicated by the repeat symbol is filled with a character indicated by the repeat symbol; the predefined structure associated with the symmetric symbol is a structure in which an area indicated by the symmetric symbol is filled with a symmetric structure of a current structure.

In some embodiments, the analyzing and processing of the interactive operation of the user includes: in the editing mode, correcting a unit segmentation error in the matrix in response to a unit re-segmentation operation of the user to the recognized matrix.

In some embodiments of the present disclosure, the analyzing and processing of an interactive operation of the user includes: in the editing mode, correcting a dimension of the recognized matrix in response to any one of the following operations: dragging at least one bracket of the matrix, such that two brackets of the matrix enclose matrix elements of required dimensions; rewriting at least one bracket of the matrix, such that the two brackets of the matrix enclose matrix elements of required dimensions; adding or correcting the dimensions on the right-bottom corner of the matrix to the required number; and correcting the dimension in a matrix dimension configuration interface.

In some embodiments of the present disclosure, the recognized formula is a chemical formula; and the expressing form includes any one of: a formula description, a chemical formula, a chemical structure, an ionic formula, and a 3D structure.

In some embodiments of the present disclosure, the recognized formula is a matrix, and the expressing manner includes any one of: a matrix description, a simplified matrix, an expanded matrix.

In some embodiments of the present disclosure, the recommended contents further include: a balanced chemical equation which is recommended based on a chemical equation balancing attribute.

In some embodiments of the present disclosure, the displaying of the recognized formula includes: automatically adjusting a size and/or expressing a form of the recognized formula according to a size of a displaying area.

In some embodiments of the present disclosure, the displaying the recognized formula further includes: compared to a recognized part of the formula, displaying a part to be input in the formula with a bigger size.

According to another aspect of the present disclosure, a formula inputting apparatus is provided. The apparatus includes: a receiver, configured to receive contents input by a user during a formula inputting procedure; a determiner, configured to determine recommended contents based on the contents input by the user; and a display, configured to display the recommended contents.

According to still another aspect of the present disclosure, an electronic device is provided. The electronic device includes: a touch screen and a processor; wherein the processor is configured to determine recommended contents based on contents input by a user, and control the touch screen to display the recommended contents; and the touch screen is configured to receive the contents and an operation instruction input by the user and display corresponding contents under the control of the processor.

The present disclosure provides a convenient and efficient formula inputting method. The method firstly recognizes a formula input by the user and displays the recognized formula, and then displays recommended content based on the recognized formula, by recommending content to the user, an accuracy ratio of the formula recognition and the inputting speed of the user are greatly increased.

In some embodiments, some formula inputting methods with respect to matrixes are provided. For example, recommendation of formulas in different expressing forms, a symmetric matrix inputting method, a filling method of elements in an area, a segmentation error correcting method, and a matrix dimension correction method are provided.

In other embodiments of the present disclosure, a formula inputting method with respect to chemical formulas is provided. For example, recommendation of formulas in different expressing forms, and recommendation of balanced chemical equation are provided.

DESCRIPTION OF THE DRAWINGS

FIG. 1 is a flowchart illustrating a formula inputting method according to an embodiment;

FIG. 2 is a flowchart illustrating a formula inputting method according to another embodiment;

FIG. 4 is a diagram illustrating an example of a recommending formula structure corresponding to user input (e.g., handwriting) according to another embodiment;

FIG. 5 is a diagram illustrating a prediction formula corresponding to an input formula, according to an embodiment;

FIGS. 9A through 9E illustrate an embodiment for recommending a complete formula based on an incomplete formula;

MODE OF THE INVENTION

Figure 3:
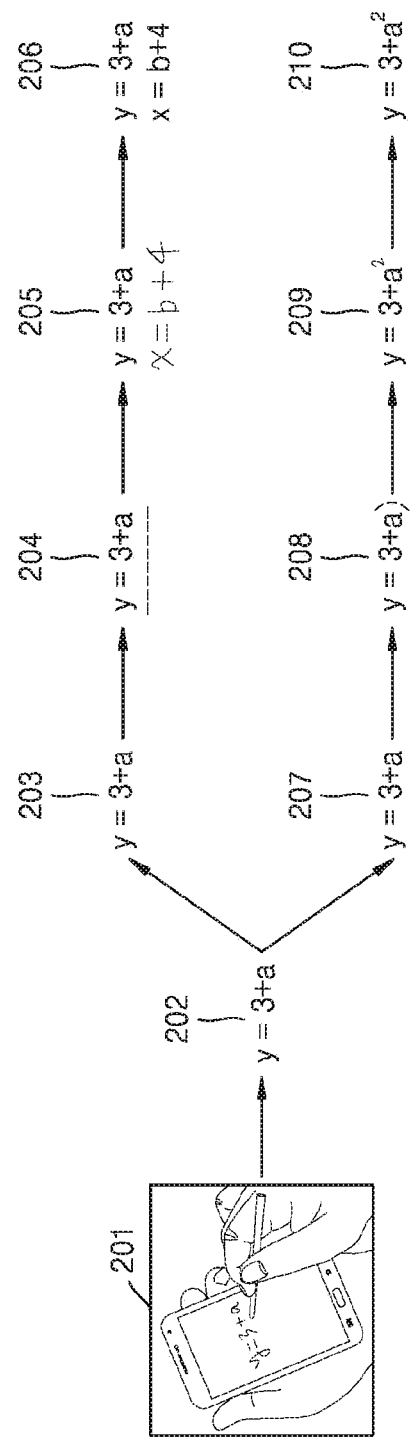
FIG. 3 illustrates a process in which a formula inputting apparatus according to an embodiment recommends a handwriting position based on a user input.

Hereinafter, exemplary embodiments will be described in detail with reference to the accompanying drawings. It is to be understood that the following embodiments are merely illustrative of the technical contents, and do not limit or restrict the scope of the rights. Those of ordinary skill in the art may easily deduce from the detailed description and examples that the scope of the present invention falls within the scope of the right.

As used herein, the terms "comprises" or "comprising", etc. should not be construed as necessarily including the various constituent elements or steps described in the specification, may not include some of the constituent elements or some of the steps, or may be interpreted to include additional constituent elements or steps.

Also, as used herein, terms including ordinals such as "first" or "second" may be used to describe various constituent elements, but the constituent elements should not be limited by the terms. These terms are used only for the purpose of distinguishing one constituent element from another constituent element.

Throughout the specification, when a part is referred to as being "connected" to another part, it includes not only "directly connected" but also "electrically connected" with another part therebetween. Also, when a portion is referred to as "including" a constituent element, it means that it may include other constituent elements, not excluding other constituent elements unless specifically stated otherwise.

The embodiments of the present disclosure and the constituent elements of the embodiments may be combined within a range in which they do not collide with each other. Hereinafter, the present disclosure will be described in more detail with reference to the drawings and embodiments.

A handwriting input of a user may be referred to herein as an analog handwriting input of the user. The handwriting input of the user may also be input via a depressurized or electrostatic user interface. The handwriting input of the user may be input using an external device such as a stylus pen as well as a user's finger.

FIGS. 1 and 2 show flowcharts of a formula inputting method according to an embodiment. According to the present embodiment, a formula inputting apparatus including a touch screen may be used to perform the formula inputting method. The formula inputting apparatus may include a smart phone, a tablet personal computer (PC), an interactive desktop, a desktop computer, etc.

As shown in FIG. 1, the formula inputting apparatus according to an embodiment receives contents input by a user (step 101). In an embodiment, the contents input by the user may be a handwriting input.

The user may input a formula to the formula inputting apparatus via various handwriting inputting methods. The handwriting inputting methods may include writing a formula by hand, inputting a formula by using a template; inputting a formula by scanning a picture or a photo including an image of the formula; or selecting a formula from formulas which are input. The formulas input by handwriting of the user may include a formula definition, a formula description or a combination of the formulas and an incomplete form of a formula. The formula according to an embodiment may include a mathematical formula, a chemical formula, a physical formula, etc. The incomplete form of the formula may include, for example, a chemical equilibrium equation that does not include a coefficient, a summation symbol that does not include a lower limit value or an upper limit value, a determinant that is missing an element of some matrix, and the like.

In an embodiment, the formula inputting apparatus may recognize the handwriting input of the user to obtain handwriting content. Based on the obtained handwriting content, the formula inputting apparatus may edit the formula and correct the formula. The user may write the formula on the touch screen of the formula inputting apparatus using a stylus pen, a finger, or other electronic instrument that may be recognized on the touch screen.

In another embodiment, the user may write some predefined symbols. The predefined symbols may include a fractional symbol (/ or –), a square root symbol (√), an integral symbol (∫), and so on. Specifically, an example of the predefined symbols is the same as shown in a diagram of FIG. 4.

The formula inputting apparatus according to an embodiment may recognize that handwritten predefined symbols are related to a structure of a formula including the corresponding predefined symbols. Accordingly, the user may easily and quickly input the formula using a structure of a related formula recommended by the formula inputting apparatus. The structure of the formula corresponding to the predefined symbols may include a repeat input structure or a symmetric matrix structure. For a matrix input, the user may easily create large arrays by repeating the same matrix using the repeat input structure. It is also possible to input repeated elements with the same value in a matrix using the repeat input structure. A symmetric matrix is a matrix in which components on both sides are completely matched either side of a main diagonal line. Thus, using the symmetric matrix structure, the user may input the main diagonal line and elements located in a top region with respect to the main diagonal line. Then, the formula inputting apparatus may input the elements located in a bottom region with respect to the main diagonal line.

A predefined symbol according to an embodiment may be defined in various formats. For example, a symmetric symbol corresponding to the symmetric matrix structure may be defined as a bidirectional arrow. Also, a repeat symbol corresponding to the repeat input structure may be defined as a unidirectional arrow.

A predefined symbol according to an embodiment may be defined as a string. For example, a consecutive input of 'rep' represents a repeat symbol, and a consecutive input of 'sym' represents a symmetric symbol.

A handwriting input according to an embodiment may use a formula template. Specifically, when a formula template corresponding to the handwriting content obtained by the handwriting input of the user exists in a database of the formula inputting apparatus, the formula inputting apparatus may display the formula template. The user may complete the formula by selecting the displayed formula template and inputting a value of a specific formula. When the formula template is used, the handwriting input may be recognized based on the selected formula template. For example, in the case of using a formula template including a summation symbol ($\Sigma$), the user may handwrite a lower limit value and an upper limit value at upper and lower sides of the summation symbol. The formula inputting apparatus may recognize the inputted handwriting input of the user and obtain the recognized handwriting input as handwriting content. The formula inputting apparatus may adjust and display a size of the obtained handwriting content based on a size of the summation symbol.

In an embodiment, the handwriting inputting method may include a step of scanning and inputting a photo or a picture containing an image of a formula. The formula inputting apparatus may recognize the inputted photo or picture, recognize the formula, and obtain and display the formula content based on the recognized formula.

In an embodiment, the handwriting inputting method may include a step of inputting a voice. The formula inputting apparatus may receive a voice input of the user, recognize a formula contained in the voice input of the user, and obtain and display the formula content based on the recognized formula.

Thereafter, the formula inputting apparatus may determine one or more recommended contents based on the content input by the user (step 102).

As shown in FIG. 2, if the content input by the user is a formula, step 102 may include steps 1021 to 1022.

In step 1021, the formula input by the user is recognized.

The user may input the formula into the formula inputting apparatus using any of the handwriting inputting methods described above. Thereafter, the formula inputting apparatus may perform an operation of recognizing the handwriting input as a formula. The formula inputting apparatus may start operations when the user clicks on a recognition button on a screen, lifts a stylus pen for a specific time, locates the stylus pen farther away by a certain distance from a handwriting screen, and draws a specific symbol starting a recognition operation, and may recognize a handwriting input as a formula based on a voice command, etc. The formula inputting apparatus may perform the operation of recognizing the handwriting input as the formula to obtain handwriting content (e.g., a string, i.e. LaTeX or MathML (mathematical formula)/CML (chemical formula)) containing formula information.

In an embodiment, the formula inputting apparatus may perform a recognition operation to display the obtained handwriting content. The obtained handwritten content may be displayed on a user interface as a print font. In some embodiments, the handwriting input directly input by the user may no longer be displayed. That is, a handwriting input and displayed on the user interface may be replaced with the obtained handwriting content.

In step 1022, the formula inputting apparatus may determine one or more recommended content based on the recognized formula.

Thereafter, the formula inputting apparatus may display the recommended content on a screen.

Thereafter, after step 103, the formula inputting apparatus may further include step 104 of analyzing and processing an interaction of the user corresponding to the displayed content.

In some embodiments, the recommendation content may include a handwriting position, a formula input structure, and a formula. In the present embodiment, after the formula input by the user is recognized and the obtained handwritten content is displayed, the formula inputting apparatus may determine the recommendation content based on the obtained handwriting content or an action of the user.

Hereinafter, various kinds of recommended contents according to an embodiment are described.

1. Recommending a Writing Position

In an embodiment, the formula inputting apparatus may recommend a writing position to the user. Specifically, the user may additionally input a handwriting input to the obtained handwriting content. In this regard, the formula inputting apparatus may recommend the handwriting position based on a distance between characters included in the obtained handwriting content and a writing instrument. The handwriting position may include a superscript position of a character, a subscript position of a character, a left or right position of a character, a position of a new line or a next line, and the like. In an embodiment, if the distance between the writing instrument and the character is within a predefined value, the recommended writing position may be displayed around the character. The distance between the character and the writing instrument may be detected using a distance sensor or the like. Also, depending on a positional relationship between the writing instrument and the character, the writing position may be recommended. Specifically, if the writing instrument is close to an upper right corner of the character, the superscript position of the character may be recommended. If the writing instrument is close to a lower right corner of the character, the subscript position of the character may be recommended. If the writing instrument is close to a right side of the character, the writing position on the right side of the character may be recommended. If the stylus pen of the user is close to a position of a new line of handwriting content on the touch screen, a handwriting position of the new line may be recommended.

The handwriting position according to an embodiment may be displayed in various ways, such as a line or a rectangular frame. To improve visibility, the handwriting position may be represented by various types of lines (dotted lines, ruled lines, etc.) or various colors or color depths (blur, darkness, etc.) different from the handwriting content.

FIG. 3 illustrates a process in which a formula inputting apparatus according to an embodiment recommends a handwriting position based on a user input. Specifically, according to a position of a stylus pen used by a user for a formula input, two examples of how the formula inputting apparatus recommends the handwriting position are described.

As shown in FIG. 3, the user may input a formula "y=3+a" with the stylus pen (201).

The handwritten formula "y=3+a" may be recognized and displayed as a printed font (202). Thereafter, when the pen is close to a bottom of the formula, i.e., at the bottom of y, a position of a new line may be indicated (203). The position of the new line may be indicated by a dotted line (204). The dotted line may be used to separate the previously input formula "y=3+a" from a region of a formula to be newly input. After the handwriting is completed, the formula may be recognized and displayed as a print font (205). At a next line of the existing formula, the newly recognized formula may be displayed (206).

According to another embodiment, when the pen is close to the recognized character, specifically, when the pen is close to "a", the formula inputting apparatus may recommend all of handwriting locations including a superscript of "a", a subscript, and a right side (207). The formula inputting apparatus may display the recommended handwriting position with a dotted line (208). Thereafter, the user may write the number "2" in a superscript position of the recommended handwriting position (209). After the handwriting is completed, "2" marked with a handwritten character may be recognized and displayed as a print font, similarly to the above-described formula input and recognition operation (210). Thus, the handwritten number "2" may be displayed as the superscript of "a".

The handwriting position recommendation operation of the above-described formula inputting apparatus may reduce an error occurrence rate of a handwritten formula recognition. This formula recognition problem may include an erroneous determination of a positional relationship of a plurality of formula identifications and subscripts or coefficients described.

2. Recommending a Formula Handwriting Structure

In another embodiment, the formula inputting apparatus may recommend the formula handwriting structure to a user. When the user inputs a predefined symbol, after the formula inputting apparatus recognizes the predefined symbol, the formula inputting apparatus may recommend the formula handwriting structure based on the recognized symbol. Specifically, the formula inputting apparatus may recommend a general formula handwriting structure that includes the recognized symbol. The predefined symbol according to an embodiment may include at least one of a fractional line, a radical symbol, a sum symbol, an inner product symbol or an outer product symbol, an integral symbol, and another special symbol.

In an embodiment, a handwriting structure associated with a character is recommended and displayed in response to determining that a writing instrument is approaching a predefined character of the recognized formula. The recommended handwriting structure may be displayed in a variety of ways so as to be distinguished from the recognized formula. Specifically, the recommended handwriting structure may be displayed as a rectangle of a color and a line type, etc. different from the recognized formula. According to the embodiment described above, the user may easily distinguish an inputted portion based on a directly handwritten formula and the recommended handwriting structure.

FIG. 4 is a diagram illustrating an example of a recommending formula structure corresponding to a user input (e.g., handwriting), according to another embodiment.

Referring to FIG. 4, a user may input handwritten special symbols. Specifically, a handwriting input of the user may include /, -, √, ∫, ∮, etc. as shown in FIG. 4. When a formula inputting apparatus receives a handwriting input of a special symbol from the user, the formula inputting apparatus may recognize the handwriting input as handwriting content. In an embodiment, the formula inputting apparatus may determine mathematically the recognized handwriting content. Thereafter, the formula inputting apparatus may determine a recommending formula structure corresponding to the determined mathematical handwriting content. The recommending formula structure according to an embodiment may be stored in the formula inputting apparatus or in an external database. The recommending formula structure stored in the database may be a predefined structure. Also, the recommending formula structure stored in the database may be obtained based on a handwriting input history of the user.

The recommending formula structure according to an embodiment may include a dotted rectangle image. Specifically, as shown in FIG. 4, an image of a position of a constituent element to be additionally input by the user may be displayed as the dotted rectangle image. For example, if the user writes a special symbol "log", the formula inputting apparatus may recognize the special symbol "log" and recommend a structure $$"\log_\square \square"$$

associated with the special symbol. After selecting the recommending formula structure, the user may write numbers or letters on the dotted rectangle image. Specifically, the user may write numbers or characters corresponding to the bottom and a decimal of the log.

As shown in FIG. 4, the structure of the formula including special symbols is generally complicated. Therefore, errors are likely to occur in recognizing a handwriting input of the user. By using the formula inputting apparatus using the recommending formula structure described above, a recognition rate of the complicated handwriting formula inputted by the user may be improved.

3. Recommendation of Formula

In an embodiment, the formula inputting apparatus may recognize the handwriting formula inputted by the user and may recommend the formula to the user. First, the formula inputting apparatus may obtain a recommending formula associated with the recognized formula and display the obtained recommending formula. The recommending formula may be predicted based on a search of an input formula, an expression form of the input formula, a formula that is equivalent to the input formula and has a different expression form, and an intrinsic property of the input formula.

3.1 Formula Search Based Formula Recommendation

FIG. 5 is a diagram illustrating a prediction formula corresponding to an input formula according to an embodiment.

In an embodiment, a formula inputting apparatus may search for input formulas to predict a formula to be recommended to a user. Specifically, the formula inputting apparatus may search for formulas related to the input formulas using an internal or external database of the formula inputting apparatus. A database according to an embodiment may include a form of a formula, a structure of a formula, handwriting record data of the user, and the like. The formula inputting apparatus may search for a formula that is the same as or similar to a recognized formula.

Referring to FIG. 5, if the user inputs "sin x", the formula inputting apparatus may search for a Taylor expansion of sin x using the database. The formula inputting apparatus may recommend and display the found Taylor expansion.

3.2 Expression Form Recommendation of Input Formulas

The formula inputting apparatus according to an embodiment may recommend an expression form based on an input formula. The input formula may be a part of the formula. Thus, the formula input device may predict the expression form of the formula to finish a complete shape after some input formulas. Specifically, referring to FIG. 5, when the user inputs "sin", the formula inputting apparatus may predict that the formula to be input is a trigonometric function and may recommend "sin A".

Furthermore, when the user inputs "f", the formula inputting apparatus may predict that the formula to be input is a function and may recommend "f (x)".

3.3 Formula Recommendation of Different Expression Forms

In some embodiments, the formula inputting apparatus may predict and recommend a formula that is equivalent to an input formula and that has a different expression form. Specifically, the formula inputting apparatus may recommend a formula that has the same meaning as a recognized formula but a different form, or a formula that has the same constituent elements as the recognized formula but has a different form. For example, when the user writes a formula with a specific expression form, the formula inputting apparatus automatically recommends a formula that is the same content but has a different form to the user.

Referring to FIG. 5, if the input formula is $H_2O$, the formula inputting apparatus may search and recommend $H_2O$ and

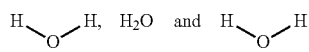

are chemical expressions having an equivalent relationship and different expression forms.

Referring to FIG. 5, when an abbreviated (m, n) type matrix is input, the formula inputting apparatus may predict and recommend another expression type of the matrix, that is, an expansion type of the matrix. According to the above-described embodiments, content of the formula inputted by the user may be simplified.

Specific content of the formula recommending method of different expression types described in FIG. 5 will be described later with reference to FIG. 6.

3.4 Recommend Formulas Based on Unique Properties of Formulas

The formula inputting apparatus may predict and recommend a formula according to intrinsic properties of input formulas. In some embodiments, the formula recommended based on the unique property of the formula may differ in content from the input formula.

Specifically, referring to FIG. 5, when the user completes an input without writing some elements of a matrix, the formula inputting apparatus may recommend a complete shape of matrix by predicting some elements.

In addition, if the user inputs a chemical formula, the formula inputting apparatus may predict and recommend a chemical formula according to a property of the chemical formula. Specifically, as shown in FIG. 5, the user may input a chemical equilibrium equation. The formula inputting apparatus may determine whether the input chemical equilibrium equation is balanced. Thereafter, if the input equilibrium equation is unbalanced, the formula inputting apparatus may recommend an appropriate coefficient value.

According to an embodiment, the formula inputting apparatus may determine whether the chemical equation is balanced by using a database.

Figure 6:
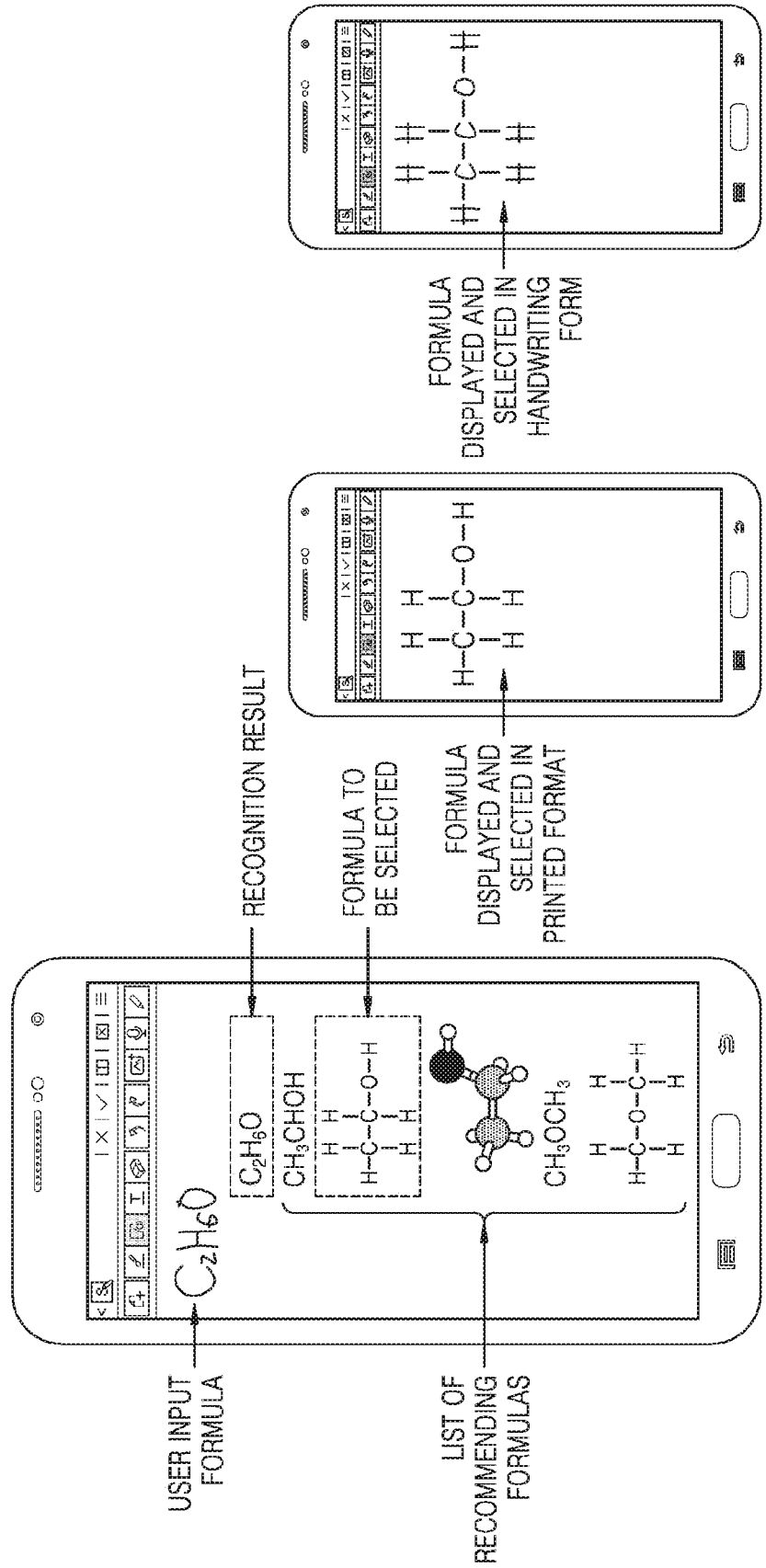
FIG. 6 illustrates an embodiment in which a formula inputting apparatus recommends a formula.

FIG. 6 illustrates an embodiment in which a formula inputting apparatus recommends a formula.

A user may wish to input the following alcohol molecular structure.

[Molecular Structure of Alcohol]

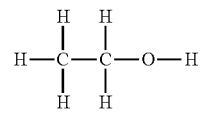

At this time, the user may handwrite a molecular formula of alcohol "C2H6O". The formula inputting apparatus may recognize the inputted formula and may display results of the recognition in a recommending formula list. Specifically, the formula inputting apparatus may recommend various formulas, such as a molecular formula, a molecular structure, and a 3D molecular structure, depending on the recognition result. The recommended formulas may then be displayed in a list form at the bottom of the recognition result. The user may select a molecular formula shown on a third line of the list of recommended formulas. The formula inputting apparatus may detect a selection action of the user to select the molecular formula shown on the third line. Then, based on the detected selection action of the user, the formula inputting apparatus may display the selected formula.

Hereinafter, a specific process in which the method described in FIG. 5 actually operates will be described in detail with reference to FIG. 6 to FIG. 13.

Two diagrams on a lower right side of FIG. 6 show a screen in which the formula inputting apparatus displays formulas selected in two expression forms. As shown in FIG. 6, each drawing shows a selected formula marked with a printed font and a selected formula indicated in handwriting.

If a formula is expressed in various forms, such as a chemical formula, the formula inputting apparatus may predict and display equations that are equivalent to the input formula. Therefore, complex formulas may easily be obtained by simply inputting formulas that are equivalent to complex formulas.

Figure 7:
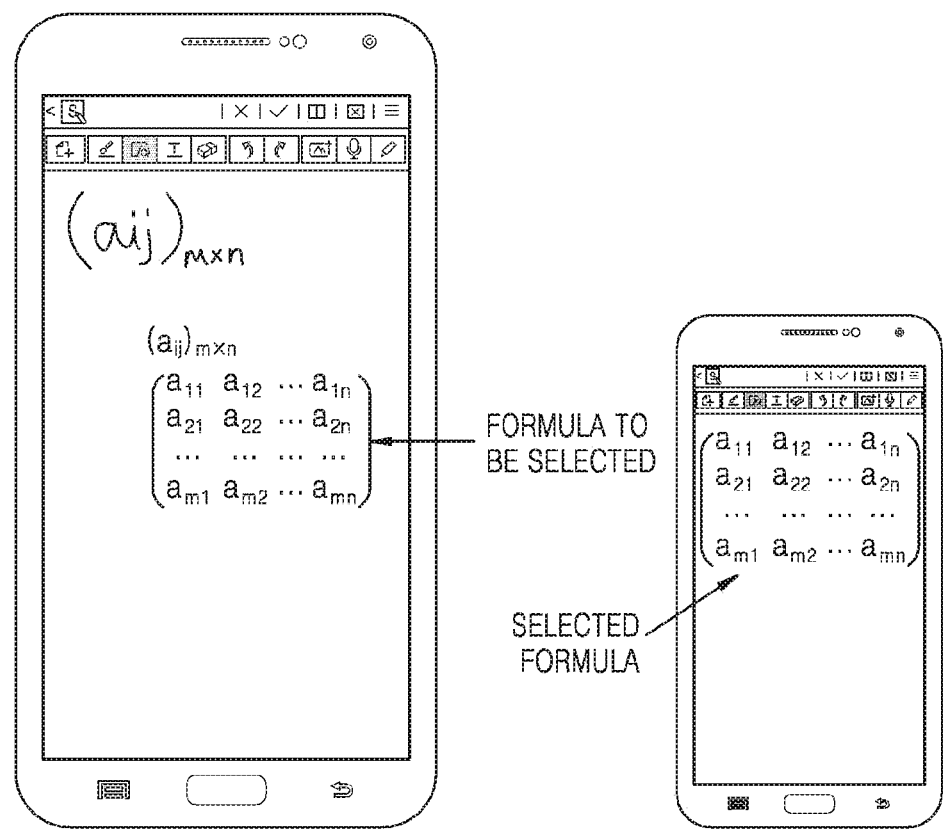
FIG. 7 shows another embodiment in which a formula inputting apparatus recommends a formula.

FIG. 7 shows another embodiment in which a formula inputting apparatus recommends a formula. In an embodiment, the formula inputting apparatus may recommend a matrix of an expanded form based on a matrix input in abbreviated form. If a user directly inputs all elements of the matrix, it may take a long time to input the formula. To solve this problem, the user may input an abbreviated form of the matrix by handwriting. As shown in FIG. 7, the formula inputting apparatus may display $(a_{ij})_{m \times n}$ is an abbreviated formula. Thereafter, the formula inputting apparatus may recommend an expansion matrix that is an equivalent relationship but has a different form. The expansion matrix is as follows:

$$\begin{pmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{pmatrix}$$

The formula inputting apparatus may detect a selection operation of the user selecting the expansion matrix. The formula inputting apparatus may then display the selected enhancement matrix.

Figure 8:
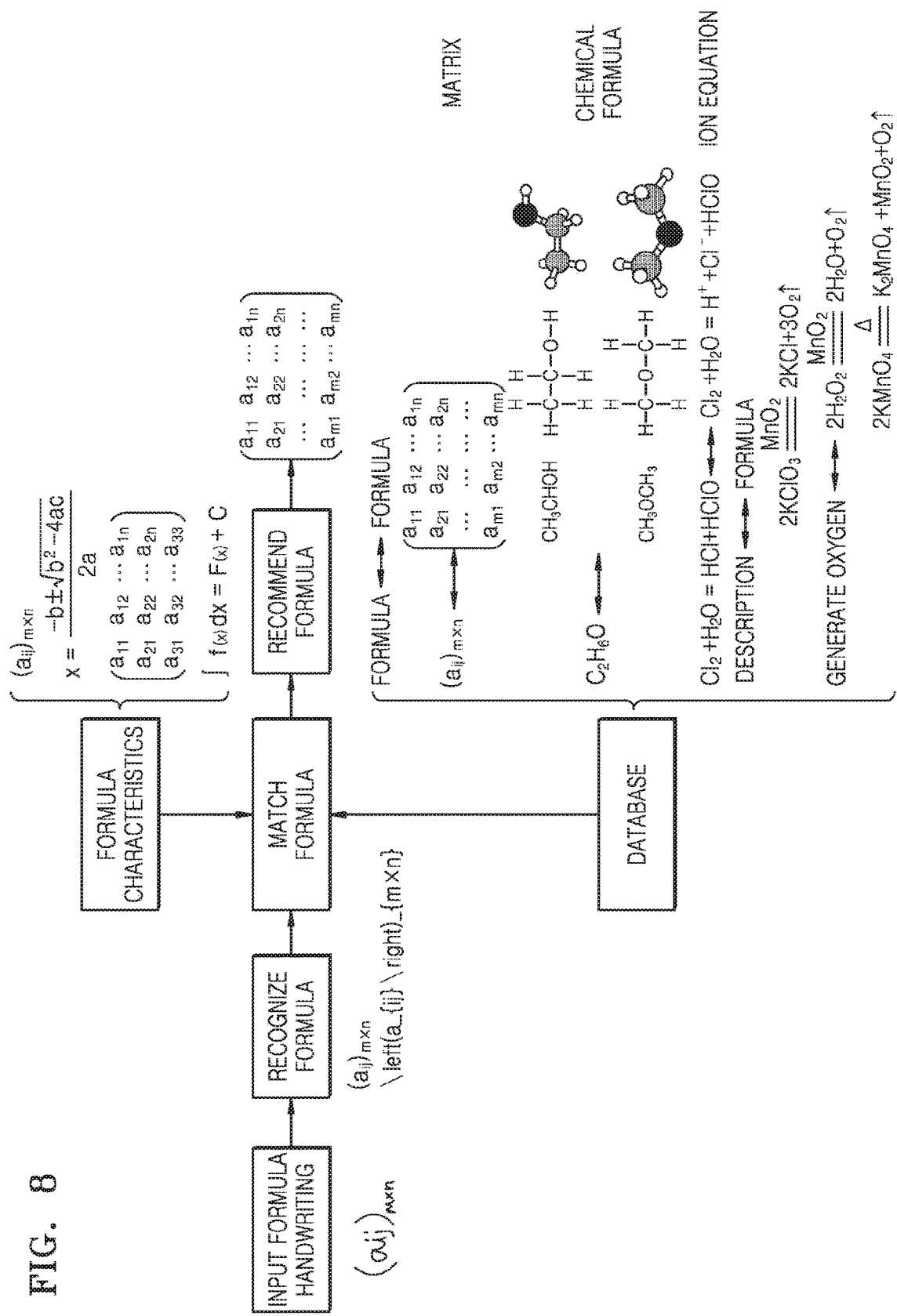
FIG. 8 is a flowchart illustrating a process in which a formula inputting apparatus obtains a recommending formula, according to an embodiment.

FIG. 8 is a flowchart illustrating a process in which a formula inputting apparatus obtains a recommending formula according to an embodiment.

This will be described below with reference to FIG. 8.

The formula inputting apparatus according to an embodiment may receive a handwriting input of a user. Specifically, the received handwriting input may be a formula handwriting input. Hereinafter, it is assumed that the received formula handwriting input is $(a_{ij})_{m \times n}$ (1701).

The formula inputting apparatus may recognize the formula inputted by the user. The formula inputting apparatus may recognize the handwriting formula input by the user as $(a_{ij})_{m \times n}$. A LaTeX expression of $(a_{ij})_{m \times n}$ is \left(a_{ij}\right)_{m×n}".

The formula inputting apparatus may perform a formula matching operation on the recognized formula $(a_{ij})_{m \times n}$. The formula matching operation may include searching a database to obtain the formula below that matches the recognized formula.

$$\begin{pmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{pmatrix}$$

The formula inputting apparatus may search for the database based on formula characteristics. Specifically, the formula characteristics may include a positional relationship of characters within a formula and a type of the formula.

More specifically, the positional relationship of the formula characters includes at least one of left-right, top-bottom, top-right, bottom-right, and enclosing. The formula type may include at least one of a matrix, a fractional line, a sum, an integral, and a chemical equation.

The database according to an embodiment may include various types of formulas of an equivalent relationship, formulas corresponding to a description of the formulas. Specifically, as shown in FIG. 8, various types of formulas of the equivalent relationship include an abbreviation matrix and an expansion matrix, a molecular equation, a molecular structure and a 3D molecular structure, a chemical equilibrium equation and an ion equilibrium equation. As an example of a formula corresponding to the description of the formula, there may be a chemical equilibrium equation indicating an oxygen production reaction and an oxygen production.

The formula inputting apparatus may recommend a formula that matches the recognized formula.

Thereafter, the selected recommending formula may be displayed according to a selection of the user. Referring to FIG. 8, the following matrix may be displayed.

$$\begin{pmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{pmatrix}$$

3.5 Recommending Complete Formula Based on Incomplete Formula

FIGS. 9A through 9E illustrate an embodiment for recommending a complete formula based on an incomplete formula. Hereinafter, the embodiment will be described with reference to FIGS. 9A to 9E.

Referring to FIG. 9A, a formula inputting apparatus may receive a handwriting input $Cl_2+H_2O=$ (1702) by the user. Thereafter, the formula inputting apparatus may recognize the received handwriting input as "Cl3+H2O=". Based on a result of the recognition, the formula inputting apparatus may recommend the complete formula. Specifically, the formula inputting apparatus may recommend the complete formula that includes content to be placed on a right side of the input formula. The recommended complete formula may be the chemical equation "Cl2+H2O=HCl+HclO" or an ion equation "Cl2+H2O=H++Cl−+HclO". The user may select one of the recommended complete formula and recognized formula.

Referring to FIG. 9B, the formula inputting apparatus may receive a handwriting input C=CO (1703) by the user. The formula inputting apparatus may recognize the received handwriting input as "C=CO". Based on a result of the recognition, the formula inputting apparatus may recommend a plurality of chemical equations including the recognized "C=CO". Specifically, the formula inputting apparatus may recommend a plurality of chemical equations including elements contained in a left side of a chemical equation. The recommended chemical equation may be "2C+O2=2CO" and "C+H2O=CO+H2".

Referring to FIG. 9C, the formula inputting apparatus may receive a handwriting input C+O2=CO (1704) by the user. The input C+O2=CO (1704) is an unbalanced formula. The formula inputting apparatus may recognize the input formula as "C+O2=CO (910)". Based on the recognition result, the formula inputting apparatus may recommend a balanced chemical equation corresponding to "C+O2=CO (910)". Specifically, the formula inputting apparatus may recommend a balanced chemical equation that includes coefficients. The formula inputting apparatus may recommend "2C+O2=2CO (911)" which contains the coefficients.

Referring to FIG. 9D, the formula inputting apparatus may receive a handwriting input $(a_{ij})_{2\times2}{}^T=$ (1705) by the user. The input $(a_{ij})_{2\times2}{}^T=$ (1705) is an abbreviation of a matrix.

The formula inputting apparatus may recognize the input $(a_{ij})_{2\times2}{}^T=$ (1705) and recommend $(a_{ij})_{2\times2}{}^T=$. Also, the formula inputting apparatus may recommend an expansion matrix $$\begin{bmatrix} a_{11} & a_{12} \\ a_{21} & a_{22} \end{bmatrix}^T =$$

that is equivalent to $(a_{ij})_{2\times2}{}^T=$ and has a different expression form. Also, the formula inputting apparatus may recommend a calculation result of the matrix corresponding to a right side of $(a_{ij})_{2\times2}{}^T=$. Finally, a matrix that the formula inputting apparatus may display as the calculation result of the matrix is as follows.

$$\begin{bmatrix} a_{11} & a_{12} \\ a_{21} & a_{22} \end{bmatrix}^T = \begin{bmatrix} a_{11} & a_{21} \\ a_{12} & a_{22} \end{bmatrix}$$

Referring to FIG. 9E, the formula inputting apparatus may receive a handwriting input $$\begin{bmatrix} x' \\ y' \end{bmatrix} = \begin{bmatrix} \phantom{x} \end{bmatrix} \begin{bmatrix} x_{sp} \\ y_{sp} \end{bmatrix}$$

(1706) by the user. The input formula is a matrix with some matrix elements missing. That is, the input matrix includes a blank matrix. Specifically, an element of a left side matrix of the right side of the formula is missing.

The formula inputting apparatus may recognize the handwriting input and may obtain $$\begin{bmatrix} x' \\ y' \end{bmatrix} = \begin{bmatrix} \phantom{x} \end{bmatrix} \begin{bmatrix} x_{sp} \\ y_{sp} \end{bmatrix}.$$

Based on a result of the recognition, the formula inputting apparatus may recommend a complete formula $$\begin{bmatrix} x' \\ y' \end{bmatrix} = \begin{bmatrix} \phantom{x} \end{bmatrix} \begin{bmatrix} x_{sp} \\ y_{sp} \end{bmatrix}.$$

As shown in FIGS. 9A to 9E, the formula inputting apparatus according to an embodiment may display a recognized formula and one or more recommended formulas on one screen.

3.6 Recommending Formulas Based on Valid Formulas

Figure 10A:
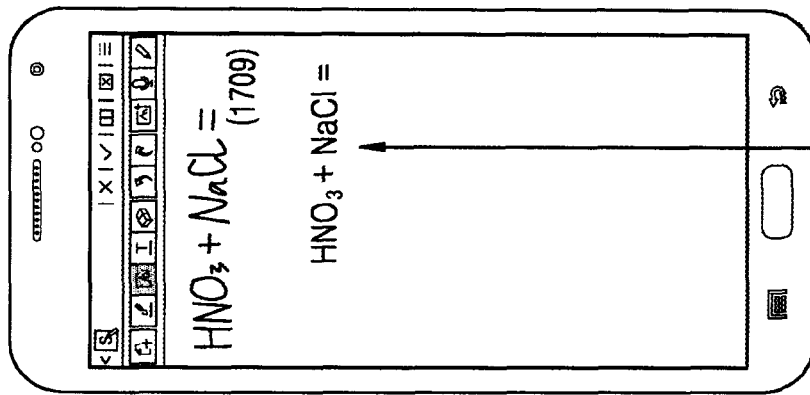
FIGS. 10A through 10C illustrate an embodiment in which a formula inputting apparatus recommends formulas.
Figure 10B:
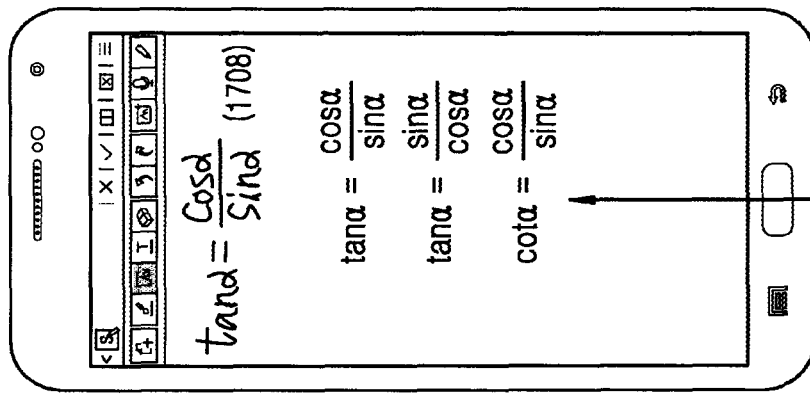
Figure 10C:
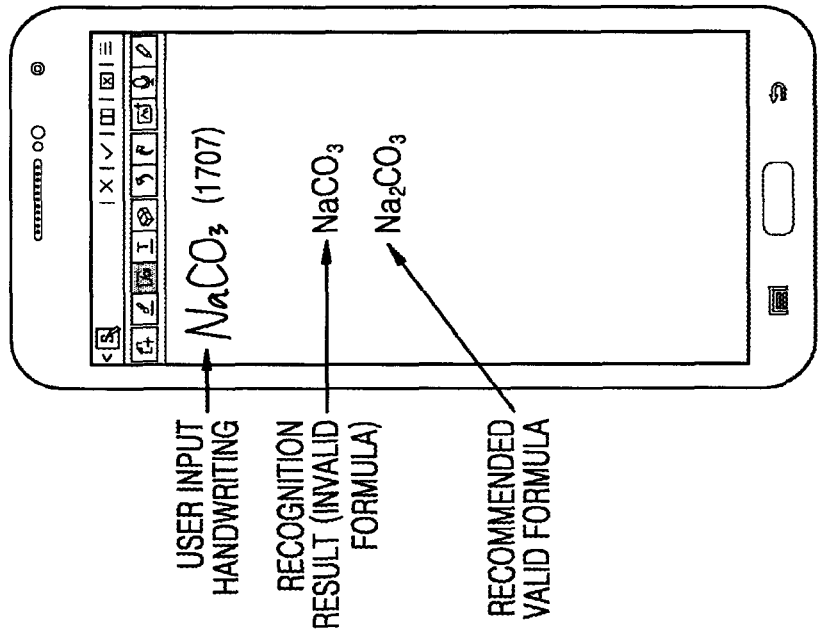

FIGS. 10A through 10C illustrates an embodiment in which a formula inputting apparatus recommends formulas.

Referring to FIG. 10A, the formula inputting apparatus according to an exemplary embodiment may receive a handwriting input NaCO3 (1707) of a user.

The formula inputting apparatus may recognize the handwritten input NaCO3 (1707) as "NaCO3". The formula inputting apparatus may determine that the recognized formula is invalid. Afterwards, the formula inputting apparatus may recommend a valid formula "Na2CO3". As shown in the figure, the handwriting input, the recognized formula, and the recommending formula may be displayed on a screen.

Referring to FIG. 10B, the formula inputting apparatus may receive a handwriting input $$\tan\alpha = \frac{\cos\alpha}{\sin\alpha}$$

(1708) of the user. The handwriting input of the user is a trigonometric function. The formula inputting apparatus may recognize the handwriting input $$\tan\alpha = \frac{\cos\alpha}{\sin\alpha}$$

(1708) of the user as $$\tan\alpha = \frac{\cos\alpha}{\sin\alpha}.$$

The formula inputting apparatus may determine that $$\tan\alpha = \frac{\cos\alpha}{\sin\alpha}$$

is invalid. Thereafter, the formula inputting apparatus may recommend a valid trigonometric function. The recommended valid trigonometric functions are as follows.

$$\tan\alpha = \frac{\sin\alpha}{\cos\alpha} \text{ and } \cot\alpha = \frac{\cos\alpha}{\sin\alpha}.$$

Referring to FIG. 10C, the formula inputting apparatus may receive a handwriting input HNO3+NaCl= (1709) of the user. The formula inputting apparatus may recognize the handwriting input HNO3+NaCl= (1709) of the user as "HNO3+NaCl=". The formula inputting apparatus may determine whether the recognized formula is an impossible chemical reaction. If the formula inputting apparatus determines that the recognized formula is an impossible chemical reaction, the formula inputting apparatus may inform the user that the recognized formula is an impossible chemical reaction in the form of a message displayed on the screen. The formula inputting apparatus may not recommend a complete formula because the input formula is an impossible chemical reaction.

3.7 Recommending Formula Based on Input Formula

Figure 11A:
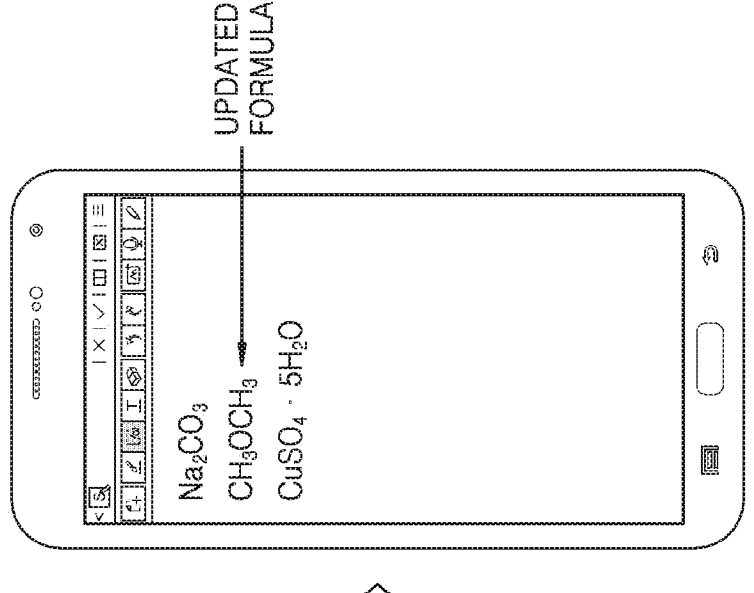
FIGS. 11A through 11C illustrate an embodiment for recommending formulas based on an input formula.
Figure 11B:
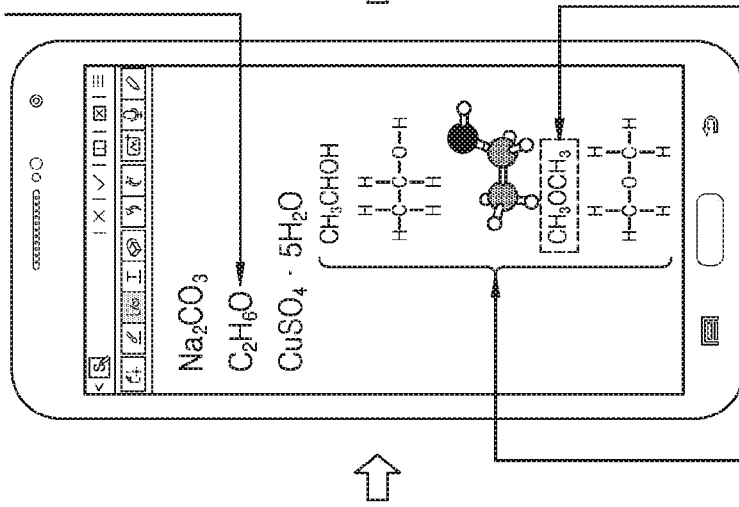
Figure 11C:
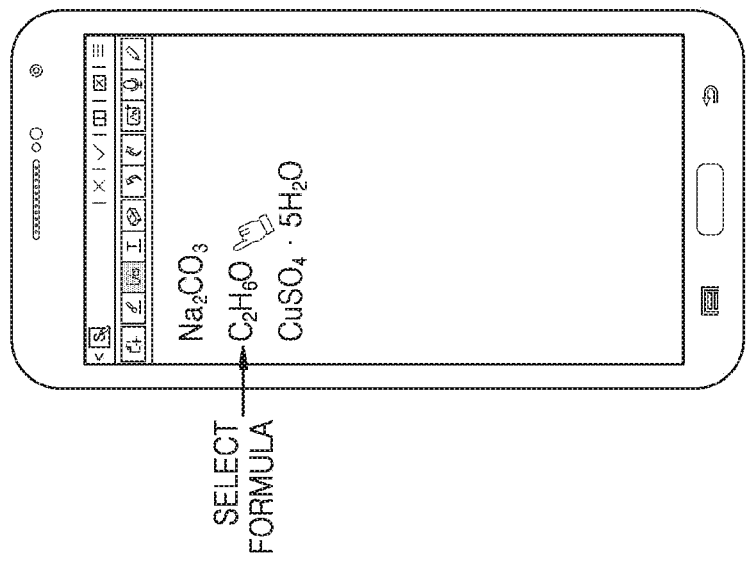

Referring to FIGS. 11A through 11C, the formula inputting apparatus according to an embodiment may display the recognized formulas "Na2CO3", "C2H6O", and "CuSO4.5H2O". The recognized formulas may be obtained based on the handwriting inputs of the user or retrieved from the database. In an embodiment, the user may want to correct "C2H6O" among the displayed formulas.

Referring to FIGS. 11A and 11B, the formula inputting apparatus may receive a user action of selecting "C2H6O". The formula inputting apparatus recommends formulas (i.e., chemical formulas, structures, and 3D structures) of different expression forms of "C2H6O" selected based on the user action. As shown in FIG. 11B, the user may select "CH3OCH3" from among the recommended formulas. The formula inputting apparatus may update "C2H6O" to "CH3OCH3" according to a selection of the user. Accordingly, the formula inputting apparatus may change and display "C2H6O" displayed on the screen to "CH3OCH3".

FIGS. 12A through 12E illustrate an embodiment for recommending formulas based on a formula description.

In an embodiment, a handwriting input received by a formula inputting apparatus may be recognized as the formula description. The formula description may include a name of the formula and a definition of the formula. The formula inputting apparatus may recommend a formula corresponding to a description of the recognized formula.

Figures 12A, 12B, 12C, 12D, 12E:
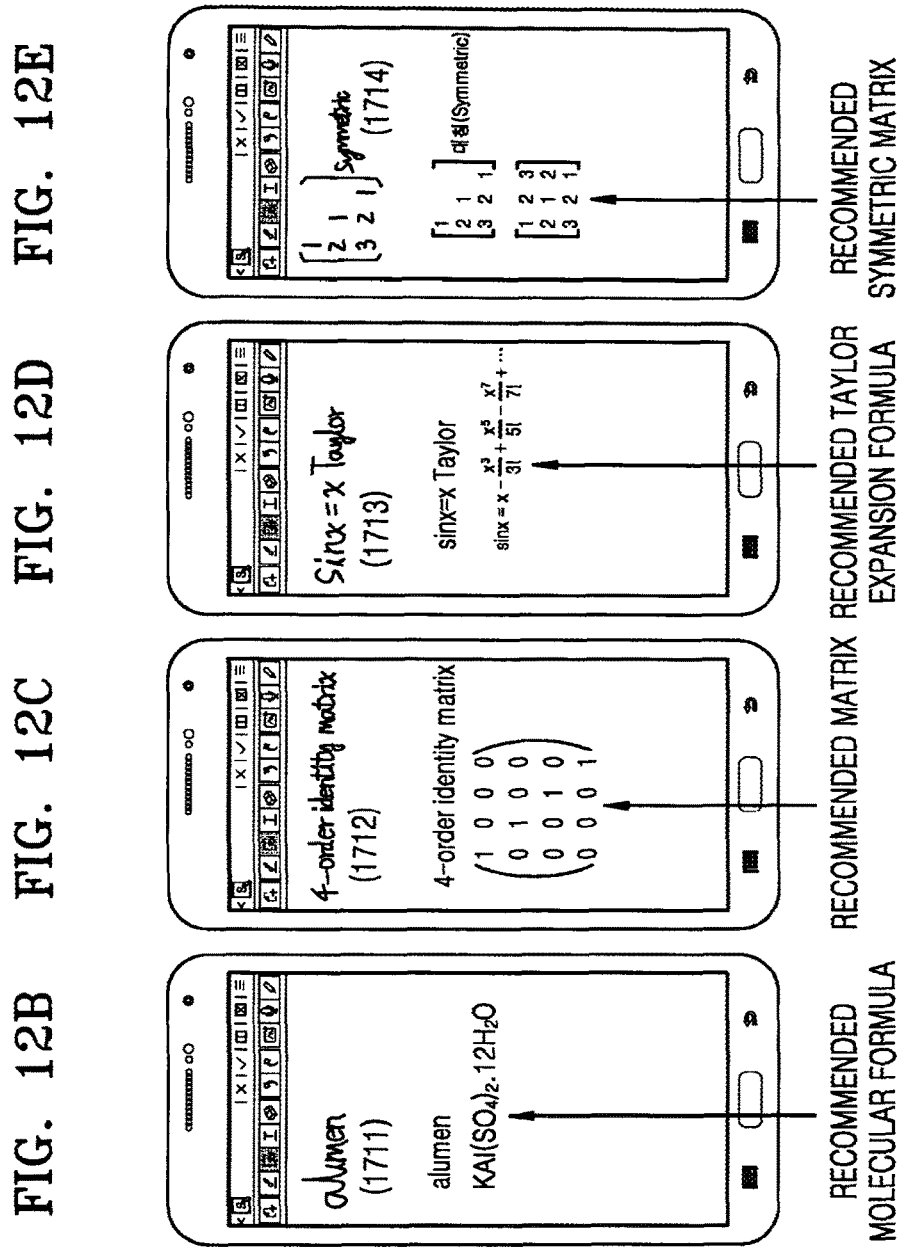
FIGS. 12A through 12E illustrate an embodiment for recommending formulas based on a formula description.

FIGS. 12A to 12C illustrate an embodiment in which a formula is recommended by recognizing the description of the formula (or the name of the formula).

FIGS. 12D to 12E illustrate an embodiment in which a formula is recommended based on mathematical formulas and how to express mathematical formulas.

Referring to FIG. 12A, the formula inputting apparatus may receive a handwriting input oxygen production (1710) of the user. The formula inputting apparatus may recognize the received handwriting input as "oxygen production". The formula inputting apparatus may display "oxygen production" on a screen. The formula inputting apparatus may recommend three formulas that express oxygen production:

$$2KClO_3 \xrightarrow{MnO_2} 2KCl + 3O_2\uparrow, \quad 2H_2O_2 \xrightarrow{MnO_2} 2H_2O + O_2\uparrow, \quad \text{and}$$
$$2KMnO_4 \xrightarrow{\Delta} K_2MnO_4 + MnO_2 + O_2\uparrow.$$

The formula inputting apparatus may display the three formulas on the screen. The user may select one of the displayed formulas.

Referring to FIG. 12B, the formula inputting apparatus may receive a handwriting input alumen (1711) of the user and recognize alumen (1711) as "alumen". The formula inputting apparatus may recommend a molecular equation KAl(SO4)2.12H20, which corresponds to a chemical name and alumen.

Referring to FIG. 12C, the formula inputting apparatus receives a handwriting input 4-order identity matrix (1712) of the user and recognizes the input as a "4-order identity matrix". Then, the formula inputting apparatus may recommend the following fourth order unit matrix.

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

The user may select a recommended matrix.

FIGS. 12D through 12E illustrate an embodiment that a formula is recommended based on a handwriting input of the user. The handwriting input of the user may be an incomplete formula and a name of an expression form of the formula. A specific embodiment will be described below with reference to the drawings.

Referring to FIG. 12D, the formula inputting apparatus may receive the handwriting input sin x=x Taylor (1713) of the user. The handwriting input of the user includes the incomplete formula "sin x=x" and the expression form "Taylor" of the formula. The formula inputting apparatus may recognize the handwriting input of the user as "sin x=x Taylor" and recommend a Taylor expansion formula of sin x below.

$$\sin x = x - \frac{x^3}{3!} + \frac{x^5}{5!} - \frac{x^7}{7!} + \dots$$

Referring to FIG. 12E, the formula inputting apparatus may receive handwriting inputs $$\begin{bmatrix} 1 & & \\ 2 & 1 & \\ 3 & 2 & 1 \end{bmatrix}$$

symmetrix (1714) of the user. The formula inputting apparatus may recognize the handwriting inputs of the user as

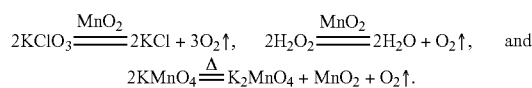

The formula inputting apparatus may recommend a below symmetric matrix according to a recognition result.

$$\begin{bmatrix} 1 & 2 & 3 \\ 2 & 1 & 2 \\ 3 & 2 & 1 \end{bmatrix}$$

Hereinafter, a method of obtaining a recommending formula based on a formula description will be described.

Figure 13:
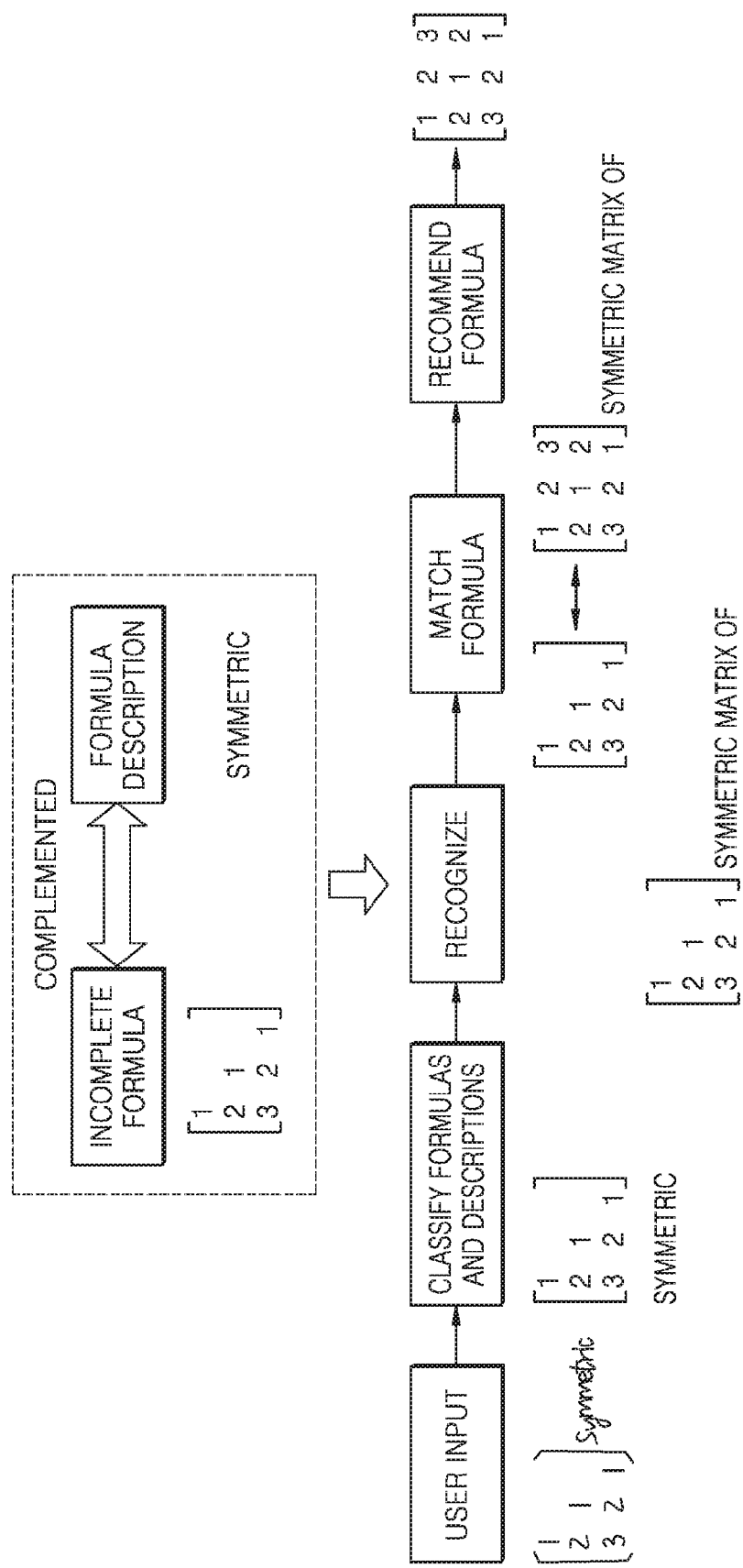
FIG. 13 is a flowchart illustrating a process in which a formula inputting apparatus obtains a recommending formula, according to an embodiment.

FIG. 13 is a flowchart illustrating a process in which a formula inputting apparatus obtains a recommending formula according to an embodiment.

As shown in FIG. 13, the formula inputting apparatus may receive a user input. The formula inputting apparatus may classify formulas and descriptions from the user input. Thereafter, the formula inputting apparatus may recognize the user input. The formula recognized in an embodiment is an incomplete matrix, and the description of the formula is symmetric. Incomplete formulas and formula descriptions may be complemented and recognized. Therefore, the formula inputting apparatus may recognize the user input as $$\text{Symmetric matrix of } \begin{bmatrix} 1 & & \\ 2 & 1 & \\ 3 & 2 & 1 \end{bmatrix}.$$

Then, through formula matching, the following formula may be finally recommended.

$$\begin{bmatrix} 1 & 2 & 3 \\ 2 & 1 & 2 \\ 3 & 2 & 1 \end{bmatrix}$$

In an embodiment, the formula recommended by the formula inputting apparatus may be arranged according to predefined rules. The predefined rules may include formula similarity, formula input frequency, and formulas that are equivalent. The formulas that are equivalent may be displayed on one screen as much as possible. Specific content with respect to obtaining recommending formulas that are equivalent is described above. The formula similarity means similarity between the recognized formula and the recommended formula. The recommending formulas may be arranged based on one or a combination of the described rules.

Figure 14:
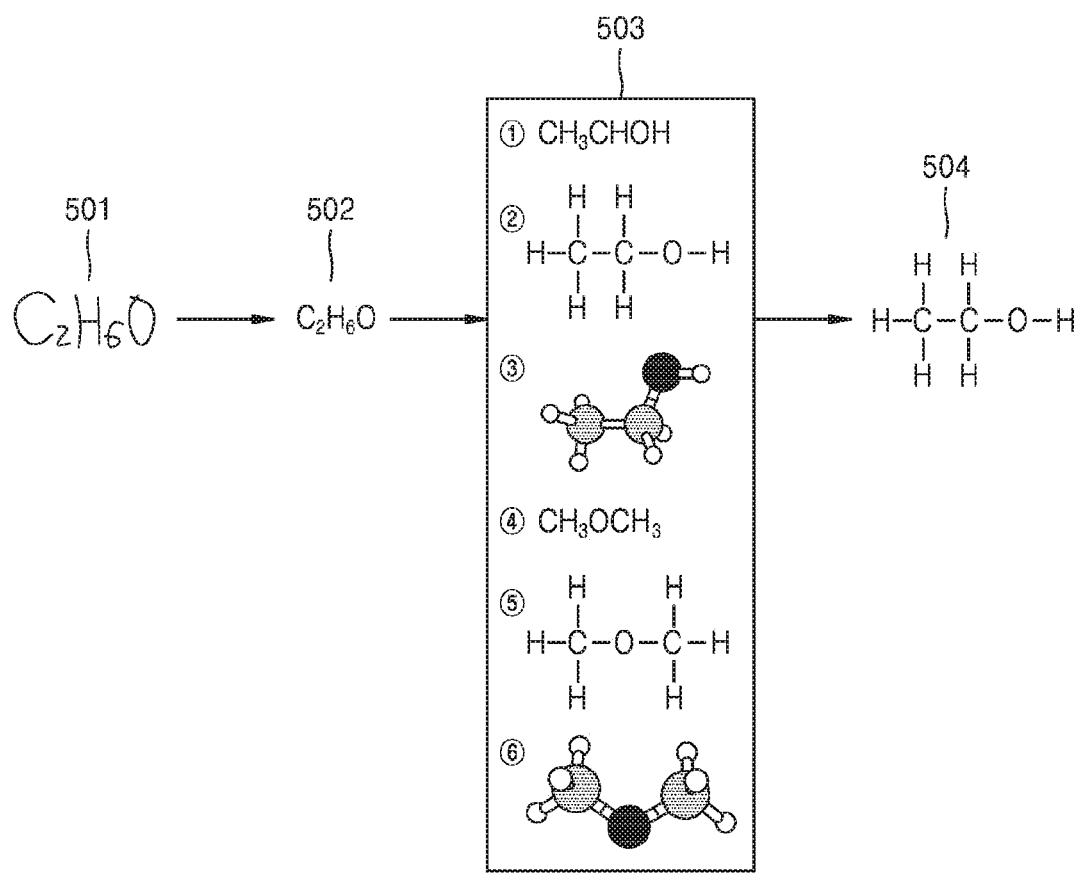
FIG. 14 is a schematic diagram illustrating an embodiment in which a formula inputting apparatus recommends a formula.

FIG. 14 is a schematic diagram illustrating an embodiment in which a formula inputting apparatus recommends a formula. As shown in FIG. 14, the formula inputting apparatus may receive a handwriting input 501 of a user. The handwriting input of the user is a molecular formula. The formula inputting apparatus may recognize the received handwriting input. As shown in 503, the formula inputting apparatus may recommend and display a molecular formula, a molecular structure, and a 3D molecular structure that are an equivalent relationship based on the recognized formula. The user may select the ② molecular structure among the recommended and displayed formulas in the list. In the present embodiment, the user may obtain a complicated molecular structure by handwriting a simple molecular formula.

Figure 15A:
FIGS. 15A through 15B are schematic diagrams showing four switching methods between an input mode and an editing mode, according to various embodiments of the present disclosure.
Figure 15B:

FIGS. 15A through 15B are schematic diagrams showing four switching methods between an input mode and an editing mode according to an embodiment.

The input mode may include a writing mode.

In an embodiment, a user interface of a formula inputting apparatus may provide a plurality of modes to enable a user to implement different actions. The formula inputting apparatus may receive a user action and may respond to the corresponding response, i.e., mode switching. In some embodiments, a mode may include the input mode and the editing mode. The input mode allows the user to write a formula. That is, the user is allowed to input the formula. The editing mode allows the user to perform various editing operations on a recognized formula, such as selecting a formula, dragging the formula, drawing a pen gesture, and so on. The formula inputting apparatus may switch between the writing mode and the editing mode in correspondence to predefined actions of the user.

Referring to FIG. 15A, the predefined actions according to an embodiment may be any one of ① pressing a button with a stylus pen, ② double-clicking a touch screen, ③ clicking a system button, and ④ selecting a system menu. When the formula inputting apparatus senses any of the predefined actions of the user ① to ④, a mode of the formula inputting apparatus may be converted into the input mode or the editing mode.

Referring to FIG. 15B, the predefined action according to an embodiment may be any one of ⑤ contacting a ringer on a touch screen while the stylus pen is operating, and (6) non-contacting the finger on the touch screen while the stylus pen is operating.

If the mode of the formula inputting apparatus detects the predefined action ⑤, the mode may be converted from the input mode to the editing mode. When the mode of the formula inputting apparatus detects the predefined action ⑥, the mode may be changed from the editing mode to the input mode.

Figure 16:
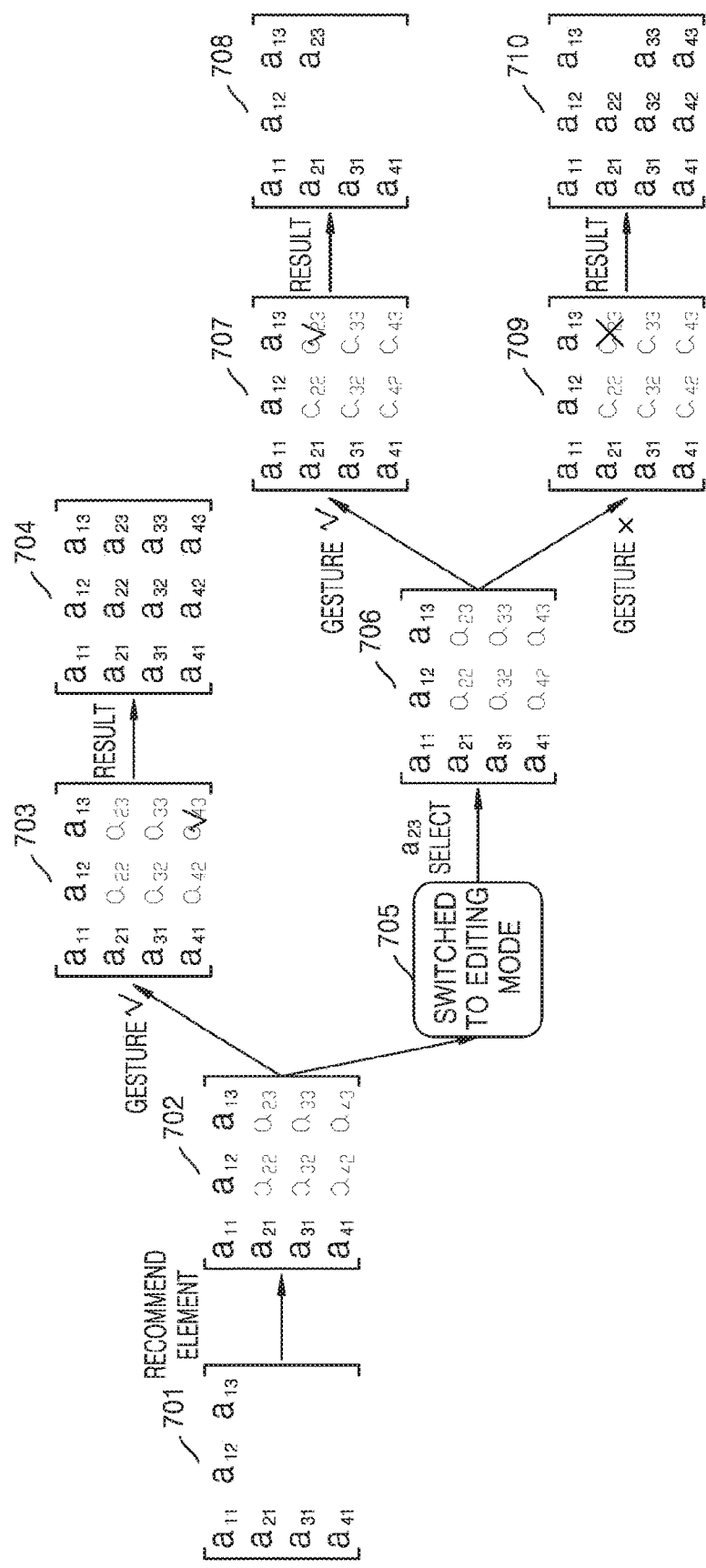
FIG. 16 is a schematic diagram illustrating an embodiment in which a user accepts or excludes a recommended element.

FIG. 16 is a schematic diagram illustrating an embodiment in which a user accepts or excludes a recommended element. In the present embodiment, "√" may be defined as a reception gesture, and "x" may be defined as a reject gesture. As shown in 701 in FIG. 16, an input (some elements of the matrix, i.e. a11, a12, a13, a21, a31, a41 in the drawing) of a user may be recognized and displayed as a matrix of a printed font. Thereafter, a formula inputting apparatus may recommend a formula based on unique properties of the recognized matrix. As shown in 702, elements (elements of a matrix that are not input, a22, a23, a32, a33, a42, a43) of the matrix recommended by the formula inputting apparatus may be displayed in a matrix recognized as a bright color (or a light color). Thereafter, the user may perform an operation of accepting the elements of the recommended matrix.

In an embodiment, as shown at 703, the user may draw "√" on the lower right element a43 of the matrix to accept the elements of all the recommended matrices and obtain the matrix 704.

In another embodiment, the user may switch an input mode to an editing mode (705) and perform an operation to individually accept elements of some recommended matrices. For example, the user may accept or exclude the element "23" of the recommended matrix. The user may select "23". The selected "23" may be displayed in a darker color than the elements of the existing recommended matrix (706). The user may draw a particular gesture over the selected "23" to accept or exclude the element. If the user accepts the selected element, other non-selected recommended matrix elements may be excluded. If the user excludes a selected symbol, other recommendation matrix elements may be accepted.

Specifically, the user may draw an acceptance gesture "√" to accept the selected element to obtain the matrix 708 (707). The user may draw an exclusion gesture "x" that excludes the selected element to obtain the matrix 710 (709).

In some embodiments, the formula inputting apparatus may correct errors in the formula recognized in the editing mode. In the editing mode, in response to a predefined action of the user, the formula inputting apparatus may recognize and correct errors of the formula displayed on a user interface. The errors of the formula may generally be categorized into three types, recognition errors, structure errors, and segmentation errors.

In an embodiment, in response to the predefined action of the user, the formula inputting apparatus may correct a character recognition error in the formula. The character recognition error means that when the user inputs a character, the formula inputting apparatus erroneously recognizes the input character with another character having a similar structure to display another character. A predefined action for correcting the character recognition error may be an action in which the user overwrites corrections on the recognized character. The formula inputting apparatus recognizes the overwritten character and may replace and display the previously recognized character with the currently recognized character.

Figure 17:
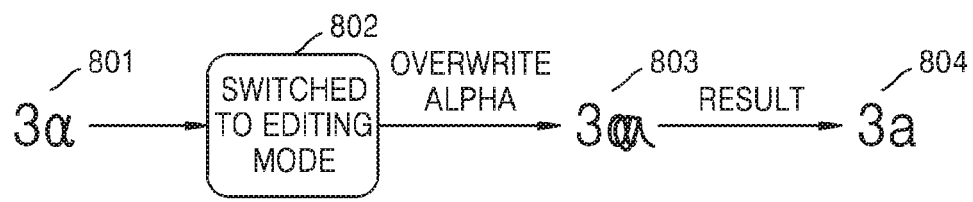
FIG. 17 is a schematic diagram showing an embodiment for correcting a character recognition error.

FIG. 17 is a schematic diagram showing an embodiment for correcting a character recognition error. As shown in FIG. 17, a user tries to input "3a", but a formula inputting apparatus erroneously recognizes an input of the user as "3α" (801). The user tries to correct this error. First, using one of the switching methods described in FIGS. 15A through 15B, the user switches an electronic device to an editing mode (802). Thereafter, the user may rewrite "a" over the erroneously recognized over "α" (803). The formula inputting apparatus may recognize "a" that the user rewrites over "α". Thereafter, the formula inputting apparatus automatically deletes "α" or moves "α" to a candidate list. The formula inputting apparatus then provides a new recognition result "3a" (804).

Figure 18:
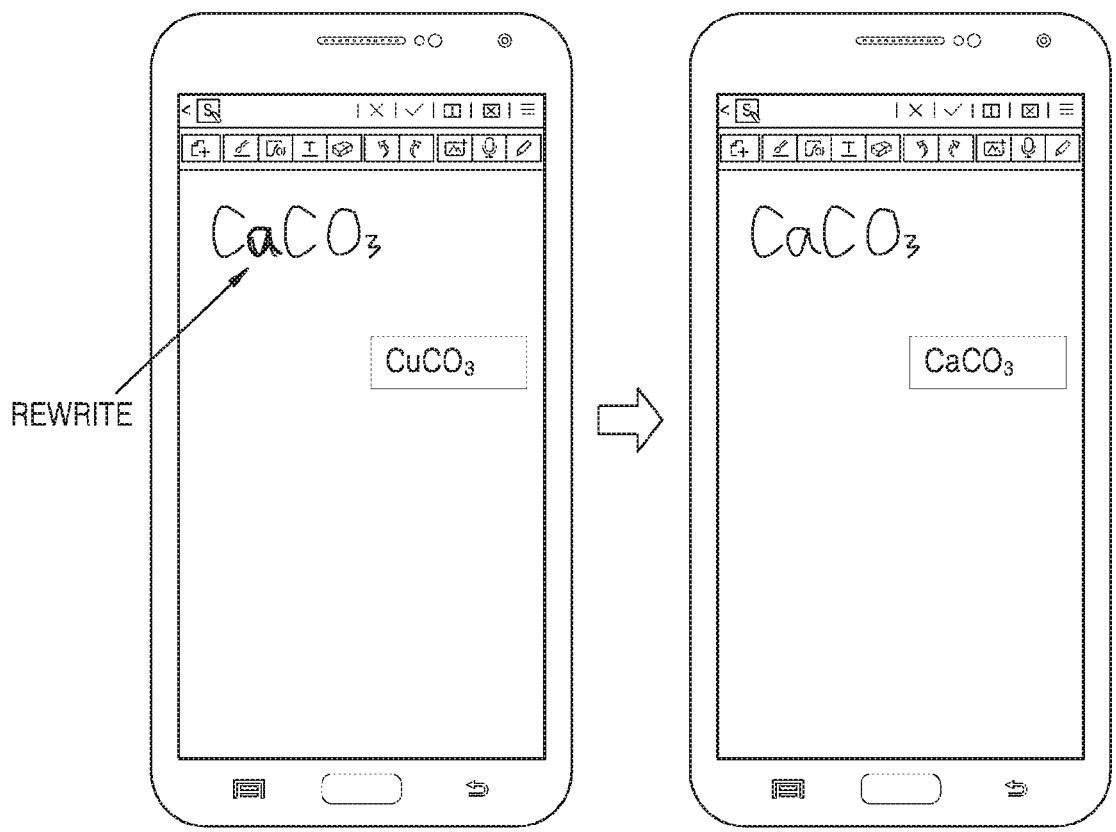
FIG. 18 shows another embodiment for correcting a character recognition error.

FIG. 18 shows another embodiment for correcting a character recognition error. As shown in FIG. 18, a user wants to input "CaCO3". However, a formula inputting apparatus erroneously recognizes an input of the user as "CuCO3". The user wants to fix this error. First, the user switches an electronic device to an editing mode using one of the switching methods described in FIG. 15A through 15B. Thereafter, the user may rewrite "a" over an erroneously recognized character "a". The formula inputting apparatus may recognize the "a" rewritten by the user over "u". Therefore, the formula inputting apparatus deletes "u" or moves "u" to a candidate list using a result of the recognition. Also, the formula inputting apparatus may display a new recognition result "CaCO3".

In an embodiment, the formula inputting apparatus may correct a structure error in a formula in response to a predefined action of the user. The structure error represents an error in determining a positional relationship between symbols. For example, the positional relationship between two groups of recognized characters may be modified corresponding to an action of the user indicating the positional relationship between the two groups of recognized symbols. The positional relationship between the two groups of symbols may include left, right, top right, bottom right, top left, bottom left, top, bottom, inside, outside, and so on. The user may select a group associated with the structure error and may drag and fix the error. Alternatively, the user may select two groups of symbols with erroneous positional relationships and correct the errors through a pen gesture. The pen gesture may be designed in a variety of methods. The variety of methods may include positional relationships using a direction of a line (i.e., right to left lines mean left and left to right lines mean right), or a character gesture indicating another direction (i.e. l means left and r means right, etc.).

Figure 19:
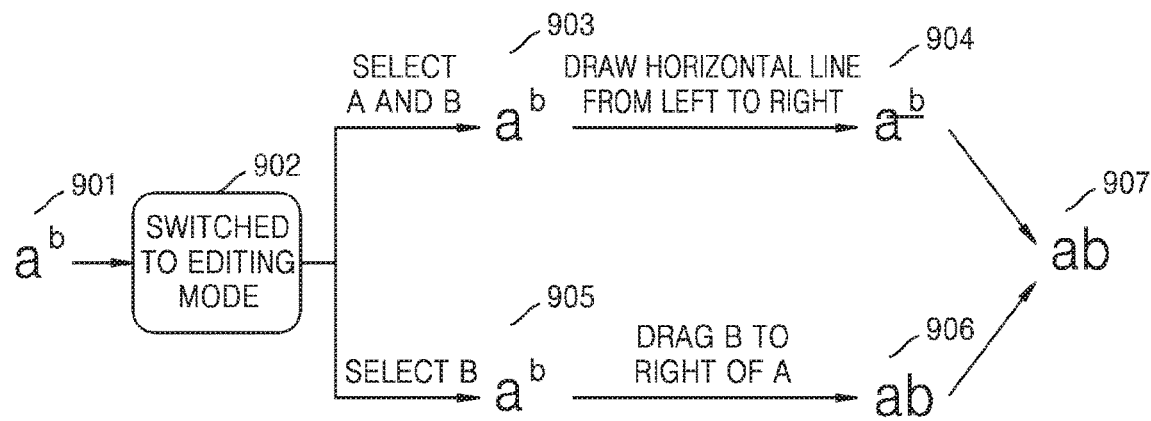
FIG. 19 is a schematic diagram showing an embodiment for correcting a positional relationship error.

FIG. 19 is a schematic diagram showing an embodiment for correcting a positional relationship error. As shown in FIG. 19, "ab" may be erroneously recognized as "ab" (901). The user wants to correct this error. First, a user may switch a formula inputting apparatus to an editing mode using one of the switching methods described in FIGS. 15A through 15B (902). The user may correct this error in the following two ways.

First, the user may select "a" and "b" (903). The user may draw a pen gesture which means a left-right relationship. In the present example, a gesture that draws a horizontal line from left to right may be defined as an action of the user converting a format of a right character in a format of a left character (904). The formula inputting apparatus may be re-recognize "ab" according to the action of the user. And the formula inputting apparatus may display "ab" (907).

Second, in an editing mode (902), the user may select a symbol "b" 905. Thereafter, the user may draw a pen gesture that drops the symbol "b" onto a right side 906 of the symbol "a". The formula inputting apparatus may re-recognize "ab" and display "ab" (907).

Figure 20:
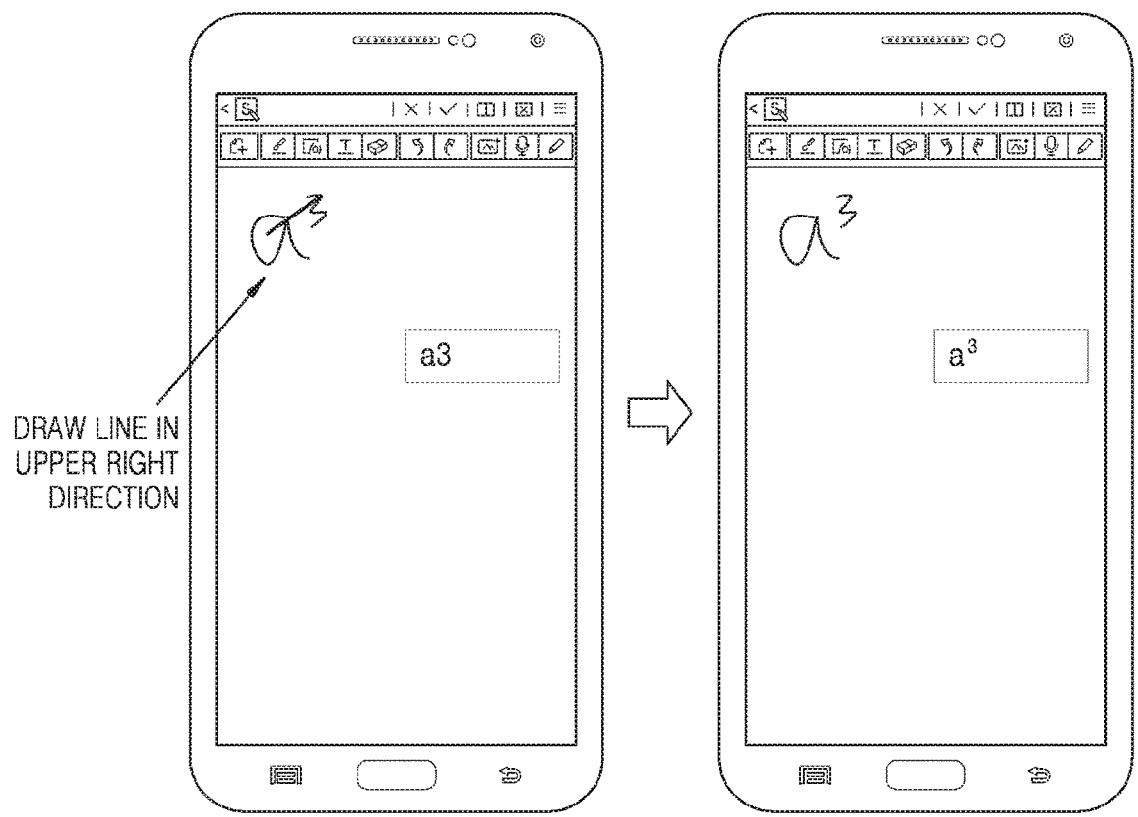
FIG. 20 shows another embodiment for correcting a positional relationship error.

FIG. 20 shows another embodiment for correcting a positional relationship error. As shown in FIG. 20, a formula inputting apparatus may erroneously recognize "a3" as "a3".

The user wants to fix this error. First, the user may switch the formula inputting apparatus to an editing mode using one of the switching methods described in FIGS. 15A through 15B. Thereafter, the recognition error may be corrected in two ways.

First, the user may select the symbols "a" and "3". Then, as shown in FIG. 20, the user may draw a line in an upper right direction. The formula inputting apparatus may obtain "a3" through formula re-recognition based on a gesture of the user.

Second, although not shown, the user may select the symbol "3" and drop the symbol "3" to the upper right corner of the symbol "a". The formula inputting apparatus may re-recognize "a3" as "a3".

In an embodiment, the formula inputting apparatus may correct a segmentation error of the formula in response to a predefined action of the user. For example, a recognized formula corresponding to a segmentation operation of the user on the recognized formula may be corrected. The segmentation error may occur mainly within a matrix. Segmentation and recognition of an element of a matrix into two or more elements may be called an over-segmentation. Recognition of two or more elements of a matrix as one element may be referred to as an over-combination. Two types of segmentation errors may be corrected using a segmentation line. Rows and columns of a matrix may be error corrected (or rearranged) based on the segmentation line of the user.

Figure 21:
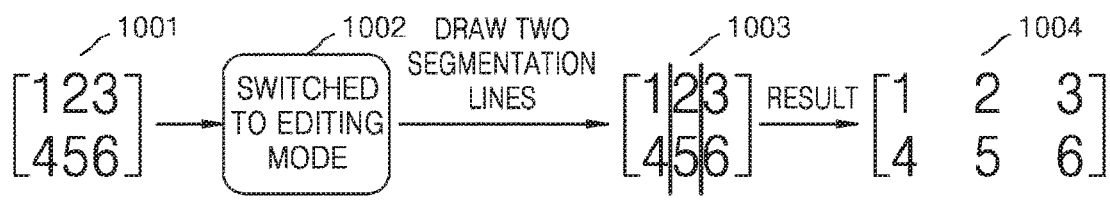
FIG. 21 is a schematic diagram illustrating an embodiment for correcting a matrix combination error.

FIG. 21 is a schematic diagram illustrating an embodiment for correcting a matrix combination error. Referring to FIG. 21, a matrix 1001 is an over-combination matrix. A user may correct an over-combination error using a method described below. First, the user may switch a formula inputting apparatus to an editing mode using one of the switching methods described in FIGS. 15A through 15B (1002). The user may draw two lines from the top to the bottom for rearranging columns of the matrix (1003). The formula inputting apparatus may obtain a matrix 1004 that the user intended to input.

Figure 22:
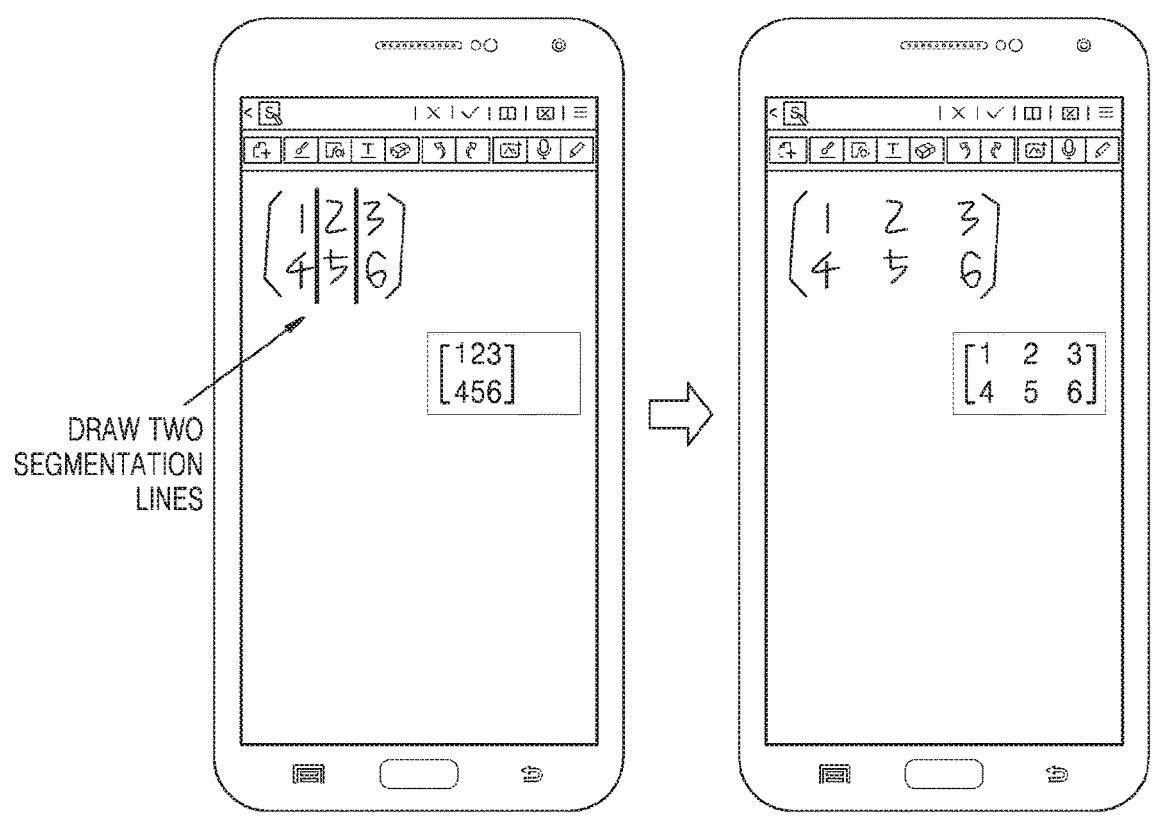
FIG. 22 illustrates another embodiment for correcting a matrix combination error.

FIG. 22 illustrates another embodiment for correcting a matrix combination error. As shown in FIG. 22, the present embodiment shows an interface of a terminal. A user wants to input the following matrix which is a 3×2 matrix:

$$\begin{bmatrix} 1 & 2 & 3 \\ 4 & 5 & 6 \end{bmatrix}$$

However, the formula input device incorrectly recognizes a handwriting input of the user as the following 1×2 matrix:

$$\begin{bmatrix} 1 & 2 & 3 \\ 4 & 5 & 6 \end{bmatrix}$$

As shown in FIG. 22, the user may perform a gesture in which two segmentation lines are drawn in an editing mode. Then, the formula inputting apparatus may display the 3×2 matrix desired by the user.

In some embodiments, the formula inputting apparatus may provide a special support for a matrix input. A matrix may include a special type matrix such as a unit matrix, a symmetric matrix, and the like. The formula inputting apparatus may support an input of the special type of matrix.

Figure 23:
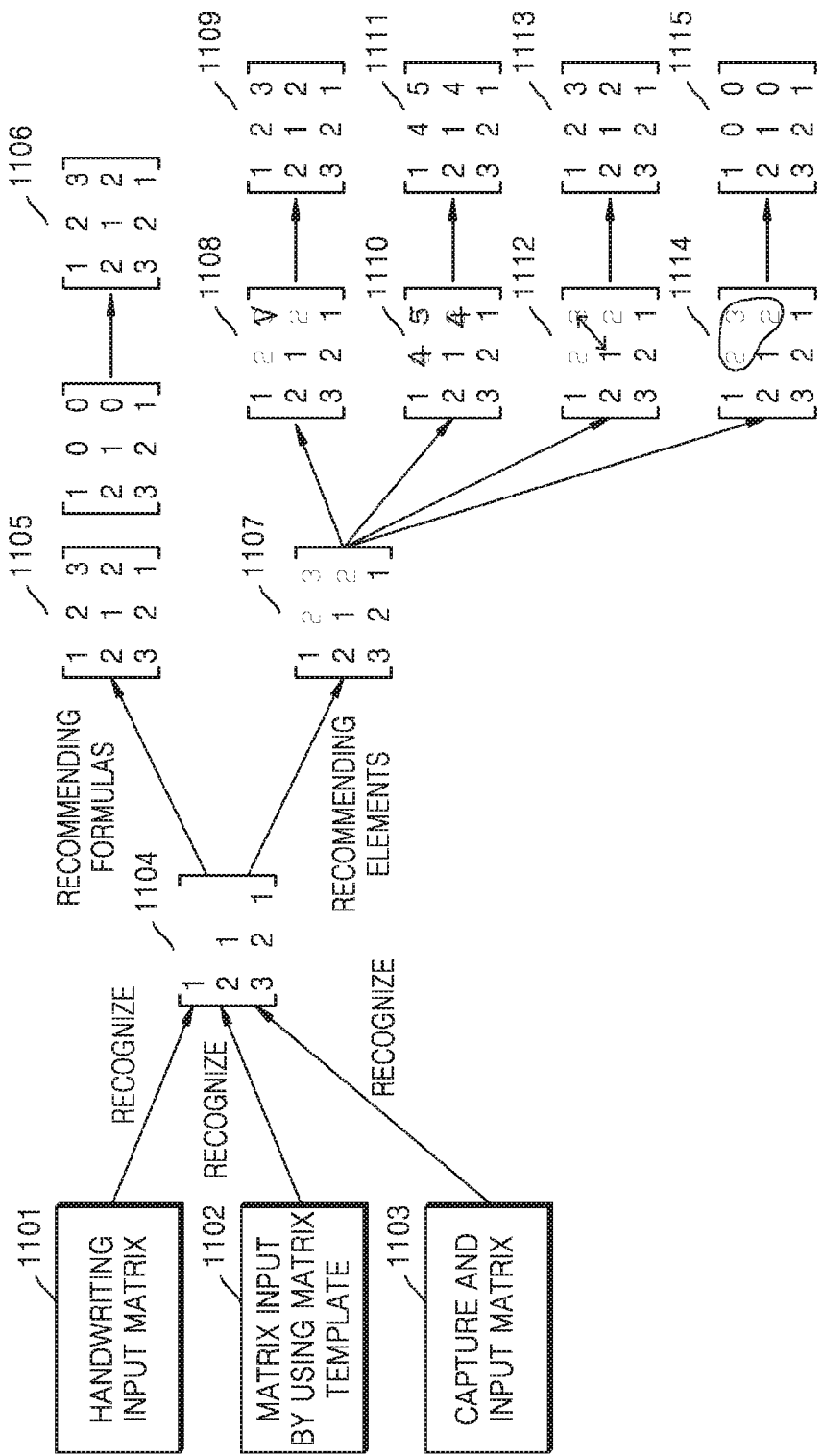
FIG. 23 is a schematic diagram illustrating a matrix input according to an embodiment.

FIG. 23 is a schematic diagram illustrating a matrix input according to an embodiment. As shown in FIG. 23, a matrix may be input by one or a combination of the methods described in step 101 of FIG. 1. For example, a user may directly write a matrix (1101) or input a matrix using a matrix template (1102) or capture an image of a matrix (1103). Thereafter, a formula inputting apparatus recognizes an input of the user for obtaining the matrix and display the recognized matrix in a printed format (1104). When the formula inputting apparatus recognizes the matrix directly handwritten by the user, the formula inputting apparatus first obtains a presence of the handwriting input of the user and then perform recognition.

When the formula inputting apparatus recognizes the input matrix using the matrix template, the formula inputting apparatus may perform formula recognition within a limited range based on the matrix template. Theoretically, a recognition rate of a handwritten matrix after selecting a matrix type template may be higher than other methods. After recognizing the matrix 1104, the formula inputting apparatus may recommend one or more complete matrices 1105 or a matrix 1107 containing some recommendation matrix elements according to formula recommending rules of step 102 of FIG. 1. In this regard, the recommending matrix element may be displayed in a different manner (for example, in a bright color) from the input and recognized element.

In an embodiment, the user may select one matrix from recommendation matrices 1105 to obtain a matrix 1106.

In another embodiment, the user may take a variety of gestures with respect to an incomplete matrix 1107 including the recommending elements. The gesture taken with respect to the incomplete matrix 1107 includes a gesture for drawing the acceptance gesture "√" to obtain a matrix 1109 on the recommending matrix element; a gesture 1110 in which an element of a matrix is directly handwritten to obtain a matrix 1111; a gesture 1112 that draws a bi-directional arrow shape to obtain a symmetric matrix 1113; and drawing "0" used for a fast repeat input in the matrix to obtain the matrix 1115 with remaining elements filled with '0'. For example, the user may draw a large "0" to fill a region filled with "0" (1114) as shown in FIG. 23.

Figure 24:
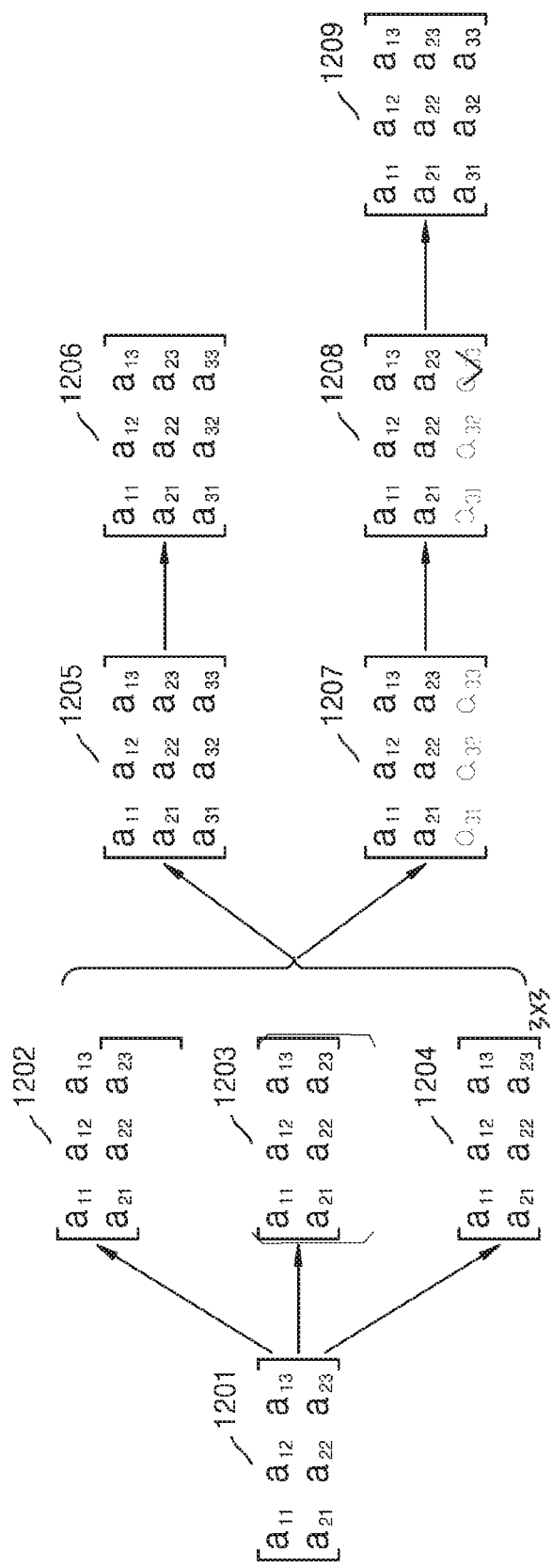
FIG. 24 is a schematic diagram illustrating a correction of a matrix dimension according to an embodiment.

Referring to FIG. 24, after the matrix input by the user is recognized, the formula inputting apparatus may correct the matrix according to predefined actions of the user. For example, the formula inputting apparatus may correct the dimension of the matrix. The predefined actions for correcting the dimension of the matrix include: placing and dragging a parenthesis of the matrix to correct the dimension (1202); rewriting at least one parenthesis of the matrix such that the parenthesis includes a matrix element of a desired dimension (1203); adding or correcting a number representing the dimension to a lower right corner of the matrix with a desired number (1204); or correcting the number of interface dimensions that constitute the matrix dimension.

Specifically, FIG. 24 is a schematic diagram illustrating a correction of a matrix dimension according to an embodiment. A user wants to correct a 2×3 matrix 1201 to a 3×3 matrix 1209. As shown in FIG. 24, the user may correct a dimension of a matrix using one of the following three methods. (note: a method of correcting the number of interface dimensions constituting the matrix dimension is not shown in FIG. 24). The user may drag a right parenthesis of the 2×3 matrix 1201 down to correct the 2×3 matrix 1201 to the 3×3 matrix 1209 (1202); alternatively, the user may rewrite left and right parentheses to correct the matrix 1201 into the 3×3 matrix 1209. Alternatively, the user may directly input '3×3' to a lower right of the matrix, as shown at 1204, to correct the 2×3 matrix 1201 to the 3×3 matrix 1209. After the dimension of the matrix is corrected, the formula inputting apparatus may automatically recommend a matrix 1205 and/or a matrix 1207 according to the formula recommending rules described in step 102 of FIG. 1.

Thereafter, the user may select the matrix 1205 to obtain the matrix 1206 of the corrected dimension. Or the user may accept an element of the recommended matrix by drawing a predefined gesture (e.g., "√" shown at 1208) to obtain the matrix 1209 of the corrected dimension.

In some embodiments, the formula inputting method may include adjusting and displaying the formula. In some embodiments, if the written formula is relatively large compared to a provided display portion, a result of the recognition may be automatically adjusted according to a size of the provided display portion. In addition, the input and recognized formulas may be automatically displayed in abbreviated form or reduced size. For example, if the user inputs a matrix of an expansion format, such as $$\begin{pmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{pmatrix},$$

the formula inputting apparatus may automatically display the input and recognized matrix $$\begin{pmatrix} a_{11} & a_{12} & \ldots & a_{1n} \\ a_{21} & a_{22} & \ldots & a_{2n} \\ \ldots & \ldots & \ldots & \ldots \\ a_{m1} & a_{m2} & \ldots & a_{mn} \end{pmatrix}$$

in abbreviated form of $(a_{ij})_{m \times n}$.

In some embodiments, if handwriting of a formula is incomplete, a part of the formula to be inputted may be recommended and displayed in a larger size compared to a part of the recognized formula. For example, if the formula inputted by the user is incomplete, a part input by the user may be displayed in reduced size, and a region to be further input may be displayed to be large. For example, if a user inputs only a part of a matrix, elements of a matrix input by the user are displayed in reduced size, while elements of the matrix recommended by the formula inputting apparatus are displayed in relatively large size.

Various embodiments of the formula inputting method and the formula inputting apparatus have been described above. The formula inputting method provided by the present disclosure may first recognize a formula inputted by a user, display the recognized formula, and then display recommended content based on the recognized formula. According to an embodiment, the formula inputting method may use a handwriting method as a main input method for a more convenient formula input. In an embodiment, the user may handwrite a formula to be inputted manually. In addition, the user may not be limited by an input order of symbols (or numbers) and a structure of a formula in a handwriting input. Since a handwriting formula is a 2D form, the formula inputting method according to an embodiment may not require a process of converting a string to a 2D form formula. Also, since the formula is inputted as handwriting input, it may not be necessary to select a special symbol or formula using an existing special character list.

The formula inputting method according to an embodiment significantly increases a recognition accuracy and an input speed of a formula through content recommended to a user. In the present specification, the formula inputting apparatus may recommend various formulas such as an element of a matrix, a formula symbol necessary for a formula, a chemical formula, a chemical structure, and a chemical equilibrium equation. In the present specification, all forms of the formulas recommended by the formula inputting apparatus may be collectively referred to as contents. That is, some of the elements of the formula or the formula itself may be collectively referred to as content.

In an embodiment, based on a recommending handwriting location and/or handwriting structure, the user may handwrite a formula at a more appropriate location to improve handwriting recognition accuracy. Accordingly, input efficiency may be improved by using the recommended handwriting location and/or handwriting structure. For example, to improve an input speed of a frequently used formula, if a part of the frequently used formula is inputted, the formula inputting apparatus may recommend a formula that is frequently used by the user. Therefore, the user may select the formula recommended by the formula inputting apparatus only by inputting a part of the formula. In some embodiments, an abbreviated input of predefined symbols, such as repeating symbols and symmetric symbols, may be supported. For example, a particular symbol may be used as a predefined symbol to support a fast input of a handwriting formula. Specifically, when a complex input and/or a repeated input is required, a specific symbol may be used.

In some embodiments, an error correction of handwriting recognition may be supported. Errors may include recognition errors, structure errors, and segmentation errors. Through an error correction method of recognition of the formula, the user may conveniently correct an error of the formula.

The formula inputting method according to an embodiment may provide a fast and efficient matrix input. Inputs of matrices may include a symmetric matrix input, an input of elements into a region, a matrix dimension correction, a segmentation error correction, and the like.

The formula inputting method according to an embodiment may be applied to a computer device that supports a handwriting input such as a cell phone, a tablet PC, and the like.

Figure 25:
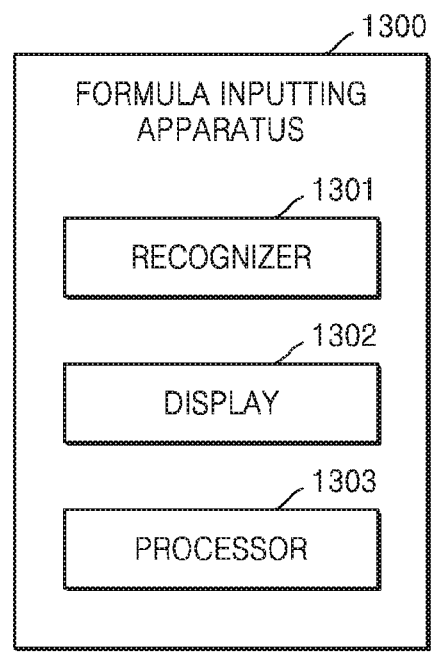
FIG. 25 is a schematic diagram illustrating a formula inputting apparatus according to an embodiment.

FIG. 25 is a schematic diagram illustrating a formula inputting apparatus according to an embodiment. As shown in FIG. 25, the formula inputting apparatus 1300 according to the present embodiment may include a recognizer 1301, a display 1302, and a processor 1303.

The recognizer 1301 may recognize a formula input by a user. A formula recognized by the user may include any of a handwriting formula, a formula input using a format template format call, a formula included in a photo, or a formula input via a scan or a combination thereof. During recognition of the formula inputted by the user, the recognizer 1301 may analyze predefined symbols of a handwriting input by a corresponding associated predefined formula structure. Predefined symbols may include repetition symbols, symmetric symbols, and the like.

The display 1302 may display the recognized formula and display recommended content based on the recognized formula. In some embodiments, display 1302 may display a recommending handwriting location around a character corresponding to a handwriting instrument action proximate to the character (or number) of the displayed formula. In another embodiment, the display 1302 may display a recommending handwriting structure associated with the character in response to a writing instrument action proximate to the character (or number) of the displayed formula. In another embodiment, the display 1302 may display a recommending formula associated with the recognized formula. The recommending formulas may be retrieved from a formula database and include at least one of a formula containing the same content as the recognized formula and a handwriting history of the user, one or more consecutive characters predicted based on the character of the recognized formula, a formula obtained based on properties of the recognized formula and a formula different from the recommended content, a formula obtained based on an expression form of the recognized formula, and a formula having the same content as the recognized formula but having a different expression form. Also, the display 1302 may display the recommended content (formula) in a different form from the recognized formula.

The processor 1303 may analyze and process an interaction of the user with respect to the displayed content. In an embodiment, the processor 1303 may switch a mode provided by the user interface to a writing mode or an editing mode in correspondence to a predefined action of the user. In the writing mode, it may be allowed to input a formula to the user, and in the editing mode, it may be allowed to edit a recognized formula to the user. The predefined action of the user includes nay one of an action of pressing a button on a stylus pen, double-clicking a touch screen, an action of touching or not touching the touch screen while the stylus pen is operating, or an action of selecting a system button or a menu.

The processor 1303 may process some or all of the recommended content in response to the predefined action of the user. In the editing mode, the processor 1303 may correct an error of the recognized formula in correspondence to the predefined action of the user. In an embodiment, in order to correct a recognition error, the processor 1303 may recognize a handwritten character corresponding to a handwriting action of the user on the recognized character and replace the recognized character with the handwritten character. In another embodiment, the processor 1303 may correct a positional relationship between two groups of characters based on an action of the user corresponding to the positional relationship between the two groups of recognized characters, in order to correct a structure error. In another embodiment, in order to correct a segmentation error, the processor 1303 may correct a recognized matrix based on a segmentation action of the user.

A configuration or a module of the formula inputting apparatus 1300 corresponding to each step of a formula inputting method has been described with reference to FIGS. 1 through 12. Therefore, the operations and configurations described in the above-described method are applicable to the modules included in the apparatus 1300 and thus are not repeatedly described. The formula inputting apparatus 1300 may further be implemented in an electronic device or an electronic device using a downloading method. The configurations corresponding to the formula inputting apparatus 1300 may cooperate with other configurations within the formula inputting apparatus for implementation of the formula inputting method. For example, the display 1302 may cooperate with a screen of the formula inputting apparatus to display the recognized formula and the recommended content on the screen.

Figure 26:
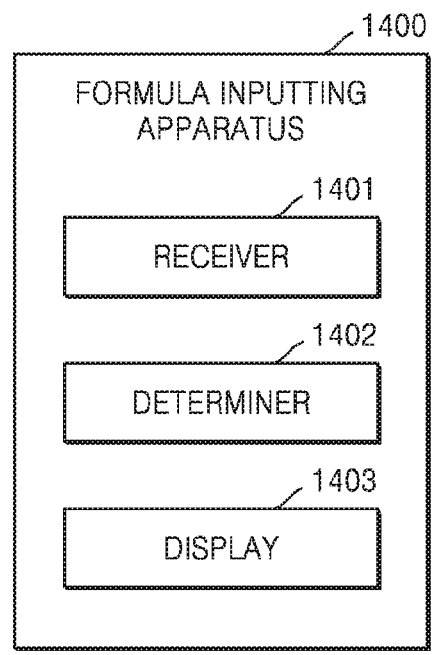
FIG. 26 is a schematic diagram showing a structure of a formula inputting apparatus according to an embodiment.

FIG. 26 is a schematic diagram showing a structure of a formula inputting apparatus according to an embodiment. As shown in FIG. 26, the formula inputting apparatus 1400 of the present embodiment may include a receiver 1401, a determiner 1402, and a display 1403.

The receiver 1401 may receive content input by a user. The determiner 1402 may determine recommended content based on the received content. The display 1403 may display the recommended content.

The determiner 1402 may perform operations of the recognizer 1301 and the processor 1303 described with reference to FIG. 25. The display 1403 may perform the operation of the display 1302 described with reference to FIG. 25.

Figure 27:
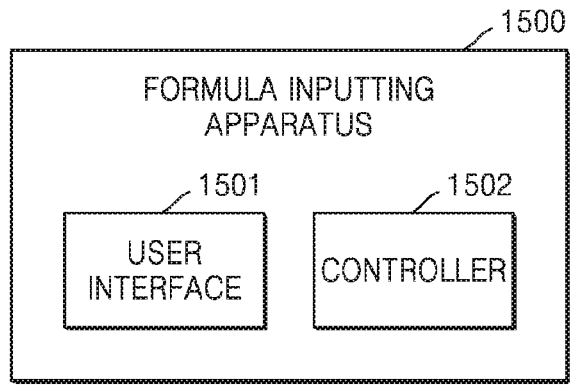
FIG. 27 is a schematic diagram illustrating a formula inputting apparatus according to an embodiment.

FIG. 27 is a schematic diagram illustrating a formula inputting apparatus according to an embodiment. As shown in FIG. 27, the formula inputting apparatus 1500 may include a user interface 1501 and a controller 1502.

The user interface 1501 may receive content input by a user. The controller 1502 may determine one or more recommended content based on the input content. The user interface 1501 may display the one or more determined recommended content.

Specifically, the user interface 1501 may receive a handwriting input of the user. The controller 1502 may obtain handwriting content based on the handwriting input of the user and may determine at least one recommended content based on the handwriting content. The user interface 1501 may display the obtained handwriting content and one or more recommended content. The obtained handwriting content may include a shape itself of the handwriting input and/or a printed font conversion by recognizing the handwriting input.

More specifically, the user interface 1501 may display one or more recommended content based on coordinate values on the user interface corresponding to the handwriting input of the user. That is, the recommended content may be displayed according to a location of the handwriting input on the user interface. In addition, the user interface 1501 may receive a user input to select one of the displayed one or more recommended content, and display the selected recommended content. As described above with reference to FIGS. 1 to 26, the handwriting content obtained by the handwriting input of the user may include at least one of a mathematical formula, a matrix, a formula, and a name of a formula (a description of a formula).

In an embodiment, when the handwriting content is a mathematical formula, the one or more recommended content may include at least one of structure information of formulas, subscript position information, and equivalence relationship information with the mathematical formula.

In an embodiment, when the handwriting content is a chemical formula, the one or more recommended content may include at least one of structure information of a molecule and coefficient information.

In an embodiment, if the handwriting content is a matrix, the one or more recommended content may include at least one of an abbreviation matrix, an expansion matrix, a unit matrix, and a symmetric matrix.

In an embodiment, if only some of elements of a matrix are input, the one or more recommended content may include remaining element information of the matrix, and the user interface 1501 may display the remaining element information with a lower brightness than the input elements of the matrix.

In an embodiment, the user interface 1501 may display a matrix of a corrected dimension according to an input of the user moving a parenthesis location of the matrix or a handwriting input of the user representing a dimension of the matrix.

In an embodiment, the user interface 1501 may receive an input of the user for displayed handwriting content or selected recommended content. An input of the user according to an embodiment may be a handwriting input. The controller 1502 may change the displayed handwriting content or the selected recommended content according to the received input of the user. Specific descriptions are provided in FIGS. 8 to 10.

The user interface 1501 may perform the operations of the display 1302 described in FIG. 25 and the receiver 1401 illustrated in FIG. 26. The controller 1502 may perform the operations of the recognizer 1301 and the processor 1303 described with reference to FIG. 25.

Figure 28:
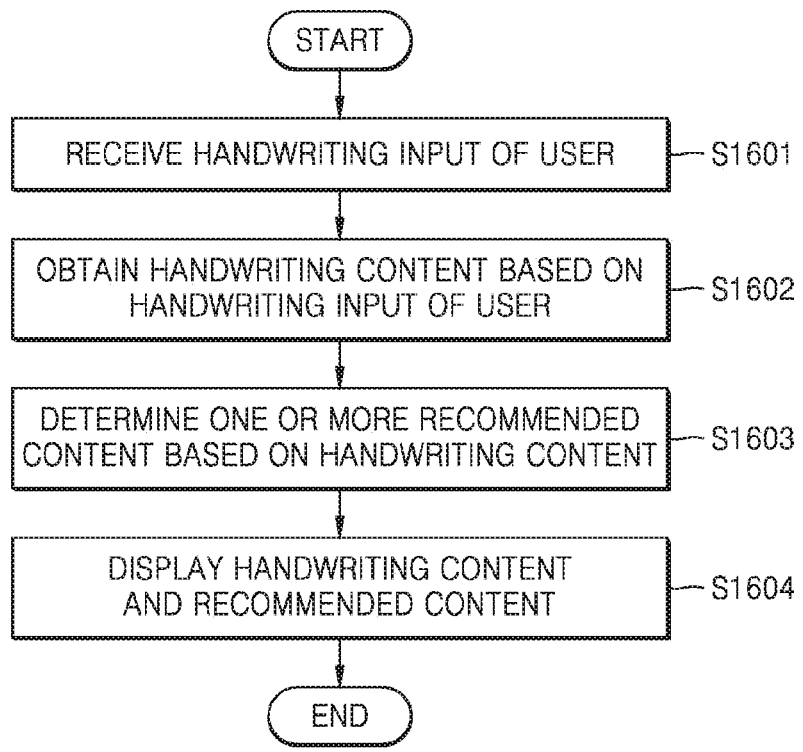
FIG. 28 is a flowchart of a formula inputting method according to an embodiment.

FIG. 28 is a flowchart of a formula inputting method according to an embodiment.

A formula inputting apparatus according to an embodiment may receive a handwriting input of a user (S1601). The formula inputting apparatus may obtain handwriting content based on the handwriting input of the user (S1602). The formula inputting apparatus may determine at least one recommended content based on the handwriting content (S1603). The formula inputting apparatus may display the handwriting content and the one or more recommended content (S1604).

According to an embodiment, the formula inputting apparatus may receive a user input that selects one of the displayed one or more recommended content. Thereafter, the formula inputting apparatus may display the selected recommended content.

In an embodiment, the handwriting content obtained with the handwriting input of the user may include at least one of mathematical formulas, matrices, formulas, names of formulas.

In an embodiment, the formula inputting apparatus may receive an input of the user for the displayed handwriting content or the selected recommended content. Thereafter, the formula inputting apparatus may change the displayed handwriting content or the selected recommended content according to the received input of the user. The input of the user according to an embodiment may be a handwriting input.

Meanwhile, the method of managing content of the device described above may be implemented in a general-purpose digital computer that may be created as a program that may be executed by a computer and operates the program using a non-transitory computer-readable recording medium. Such a non-transitory computer readable recording medium includes a storage medium such as a magnetic storage medium (e.g., ROM, floppy disk, hard disk, etc.) and optical reading medium (e.g., CD ROM, DVD, etc.)

Example embodiments have been described up to now. It will be understood by those of ordinary skill in the art that the disclosed embodiments may be embodied in various other forms without departing from the essential characteristics thereof. Therefore, the disclosed embodiments should be considered in an illustrative rather than a restrictive sense. The scope of the invention being indicated by the appended claims rather than by the foregoing description of the embodiments, and all differences within the scope of equivalents thereof should be construed as being included in the scope of the invention.

The invention claimed is:

1. A formula inputting apparatus comprising:
   a user interface configured to receive a handwriting input of a user; and a controller configured to:
 obtain handwriting content based on the handwriting input of the user,
 determine, based on a type of the handwriting content, a recommended formula structure which is different from a formula structure of the handwriting content, and
 determine one or more recommended content based on the recommended formula structure,
 wherein the user interface displays the handwriting content and the one or more recommended content.

2. The formula inputting apparatus of claim 1, wherein the user interface further displays a list of the one or more recommended content at a location based on coordinate values corresponding to the handwriting input of the user on the user interface.

3. The formula inputting apparatus of claim 2, wherein the user interface is further configured to receive a user input selecting one of the displayed one or more recommended content from the list and display the selected recommended content.

4. The formula inputting apparatus of claim 3,
 wherein the user interface is further configured to receive a second handwriting input of the user with respect to the displayed handwriting content or the selected recommended content, and
 wherein the controller is further configured to change the displayed handwriting content or the selected recommended content according to the second handwriting input.

5. The formula inputting apparatus of claim 1, wherein the handwriting content obtained by the handwriting input of the user comprises at least one of a mathematical formula, a matrix, a chemical formula, or a name of a formula.

6. The formula inputting apparatus of claim 5, wherein, when the handwriting content comprises the mathematical formula, the one or more recommended content comprises at least one of structure information, subscript position information, or equivalence relationship information with respect to the mathematical formula.

7. The formula inputting apparatus of claim 5, wherein, when the handwriting content comprises the chemical formula, the one or more recommended content comprises at least one of structure information of a molecule or coefficient information.

8. The formula inputting apparatus of claim 5, wherein, when the handwriting content comprises the matrix, the one or more recommended content comprises at least one of an abbreviation matrix, an expansion matrix, a unit matrix, or a symmetric matrix.

9. The formula inputting apparatus of claim 8,
 wherein the user interface displays the matrix having a dimension corrected according to an input of the user moving a parenthesis location of the matrix or a second handwriting input of the user indicating a dimension of the matrix.

10. The formula inputting apparatus of claim 8,
 wherein, when a part of elements included in the matrix is input, the one or more recommended content comprises remaining element information of the matrix, and
 wherein the user interface is further configured to display the remaining element information with a lower brightness than the input elements of the matrix.

11. A formula inputting method comprising:
 receiving a handwriting input of a user;
 obtaining handwriting content based on the handwriting input;
 determining, based on a type of the handwriting content, a recommended formula structure which is different from a formula structure of the handwriting content;
 determining one or more recommended content based on the recommended formula structure; and
 displaying the handwriting content and the one or more recommended content.

12. The formula inputting method of claim 11, further comprising displaying a list of the one or more recommended content at a location based on coordinate values corresponding to the handwriting input.

13. The formula inputting method of claim 11, further comprising:
 receiving a user input selecting one of the displayed one or more recommended content from a list of the one or more recommended content; and
 displaying the selected recommended content.

14. The formula inputting method of claim 11, wherein the handwriting content obtained based on the handwriting input comprises at least one of a mathematical formula, a matrix, a chemical formula, or a name of a formula.

15. The formula inputting method of claim 14,
 wherein, when the handwriting content comprises the mathematical formula, the one or more recommended content comprises at least one of structure information, subscript position information, or equivalence relationship information with respect to the mathematical formula, and
 wherein, when the handwriting content is the chemical formula, the one or more recommended content comprises at least one of structure information of a molecule and or coefficient information.

16. The formula inputting method of claim 14, wherein, when the handwriting content comprises the matrix, the one or more recommended content comprises at least one of an abbreviation matrix, an expansion matrix, a unit matrix, or a symmetric matrix.

17. The formula inputting method of claim 16, wherein the matrix has a dimension corrected according to an input of the user moving a parenthesis location of the matrix or a second handwriting input of the user indicating a dimension of the matrix.

18. The formula inputting method of claim 16, wherein, when a part of elements included in the matrix is input:
 the one or more recommended content comprises remaining element information of the matrix, and
 the method further comprises displaying the remaining element information with a lower brightness than the input elements of the matrix.

19. The formula inputting method of claim 13, further comprising:
 receiving a second handwriting input of the user with respect to the displayed handwriting content or the selected recommended content, and
 changing the displayed handwriting content or the selected recommended content according to the second handwriting input.

20. A non-transitory computer-readable recording medium having recorded thereon a computer program that when executed by at least one processor performs a method comprising:
 receiving a handwriting input of a user;
 obtaining handwriting content based on the handwriting input;

determining, based on a type of the handwriting content, a recommended formula structure which is different from a formula structure of the handwriting content;
determining one or more recommended content based on the recommending formula structure; and
displaying the handwriting content and the one or more recommended content.

\* \* \* \* \*